(12) United States Patent
Haruki et al.

(10) Patent No.: US 9,207,743 B2
(45) Date of Patent: Dec. 8, 2015

(54) DEVICE FOR CALCULATING A TIME REQUIRED FOR SYSTEM PROCESSING AFTER THE SYSTEM RESUMES FROM SLEEP AND SETTING AN OPERATION MODE ACCORDINGLY

(71) Applicants: Hiroyoshi Haruki, Kanagawa (JP); Koichi Fujisaki, Kanagawa (JP); Junichi Segawa, Kanagawa (JP); Satoshi Shirai, Kanagawa (JP); Yusuke Shirota, Kanagawa (JP); Akihiro Shibata, Tokyo (JP); Masaya Tarui, Kanagawa (JP); Tetsuro Kimura, Tokyo (JP); Tatsunori Kanai, Kanagawa (JP); Haruhiko Toyama, Kanagawa (JP)

(72) Inventors: Hiroyoshi Haruki, Kanagawa (JP); Koichi Fujisaki, Kanagawa (JP); Junichi Segawa, Kanagawa (JP); Satoshi Shirai, Kanagawa (JP); Yusuke Shirota, Kanagawa (JP); Akihiro Shibata, Tokyo (JP); Masaya Tarui, Kanagawa (JP); Tetsuro Kimura, Tokyo (JP); Tatsunori Kanai, Kanagawa (JP); Haruhiko Toyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 254 days.

(21) Appl. No.: 13/724,106

(22) Filed: Dec. 21, 2012

(65) Prior Publication Data
US 2013/0191670 A1 Jul. 25, 2013

(30) Foreign Application Priority Data
Jan. 20, 2012 (JP) ................................ 2012-010161

(51) Int. Cl.
*G06F 1/32* (2006.01)
*G06F 1/26* (2006.01)

(52) U.S. Cl.
CPC .............. *G06F 1/3234* (2013.01); *G06F 1/263* (2013.01); *G06F 1/3212* (2013.01); *G06F 1/3228* (2013.01); *G06F 1/3237* (2013.01); *G06F 1/3287* (2013.01); *Y02B 60/1221* (2013.01); *Y02B 60/1282* (2013.01); *Y02B 60/1292* (2013.01); *Y02B 60/32* (2013.01)

(58) Field of Classification Search
CPC ...... G06F 1/3234; G06F 1/263; G06F 1/3212; G06F 1/3237; G06F 1/3287; G06F 1/3228; Y02B 60/32
USPC .................................................... 713/300, 320
See application file for complete search history.

(56) References Cited

U.S. PATENT DOCUMENTS

| 8,276,009 B2 * | 9/2012 | King .............................. 713/320 |
| 2007/0234088 A1 * | 10/2007 | Marshall et al. .............. 713/320 |

FOREIGN PATENT DOCUMENTS

| JP | 2002-049610 | 2/2002 |
| JP | 2007-108856 | 4/2007 |
| JP | 2008-005336 | 1/2008 |
| JP | 2010-066907 | 3/2010 |
| JP | 2010-113641 | 5/2010 |
| JP | 2011-065705 | 3/2011 |

OTHER PUBLICATIONS

Office Action of Notice of Rejection for Japanese Patent Application No. 2014-237877 Dated Dec. 24, 2014, 6 pages.
Office Action of Notice of Rejection for Japanese Patent Application No. 2014-237877 Dated Apr. 14, 2015, 10 pages.

* cited by examiner

*Primary Examiner* — Mark Connolly
(74) *Attorney, Agent, or Firm* — Amin, Turocy & Watson, LLP

(57) ABSTRACT

According to an embodiment, a control device includes a calculator and a setting unit. The calculator is configured to calculate a system processing time indicating a time required for processing executed after a system, the system including a plurality of elements, power to each element being individually controlled, resumes from a sleep state in which the number of elements supplied with power is limited to a predetermined number and an operation of the system is stopped. The setting unit is configured to set a mode indicating an operation state of the system according to the system processing time calculated by the calculator when a resume factor indicating a factor for resuming the system from the sleep state occurs.

26 Claims, 26 Drawing Sheets

| INTERRUPT TYPE | INTERRUPT LATENCY | INTERRUPT PROCESSING TIME |
|---|---|---|
| DEVICE READING | T1_m | T1_s |
| KEYBOARD INPUT | T2_m | T2_s |
| TIMER | T3_m | T3_s |
| MOUSE INPUT | T4_m | T4_s |

| INTERRUPT TYPE | INTERRUPT WAITING OCCURRENCE TIME |
|---|---|
| DEVICE READING | Ta |
| KEYBOARD INPUT | Tb |
| TIMER | Tc |

FIG.11

| POWER GENERATING TENDENCY | AMOUNT OF CHARGE | DECIDING UNIT USED |
|---|---|---|
| INCREASE | LESS THAN FIRST THRESHOLD VALUE (40%) | CALCULATION UNIT AND FIRST DECIDING UNIT |
| INCREASE | OTHER RANGE | SECOND DECIDING UNIT |
| LITTLE CHANGE | EQUAL TO OR GREATER THAN SECOND THRESHOLD VALUE (50%) LESS THAN THIRD THRESHOLD VALUE (60%) | CALCULATION UNIT AND FIRST DECIDING UNIT |
| LITTLE CHANGE | OTHER RANGE | SECOND DECIDING UNIT |
| DECREASE | EQUAL TO OR GREATER THAN FOURTH THRESHOLD VALUE (70%) | CALCULATION UNIT AND FIRST DECIDING UNIT |
| DECREASE | OTHER RANGE | SECOND DECIDING UNIT |

FIG.12

| POWER GENERATING TENDENCY | AMOUNT OF CHARGE | MODE OF SYSTEM |
|---|---|---|
| INCREASE | EQUAL TO OR GREATER THAN NINTH THRESHOLD VALUE (30%) | SECOND MODE |
| INCREASE | OTHER RANGE | FIRST MODE |
| LITTLE CHANGE | EQUAL TO OR GREATER THAN TENTH THRESHOLD VALUE (50%) | FIRST MODE |
| LITTLE CHANGE | OTHER RANGE | SECOND MODE |
| DECREASE | EQUAL TO OR GREATER THAN ELEVENTH THRESHOLD VALUE (70%) | FIRST MODE |
| DECREASE | OTHER RANGE | SECOND MODE |

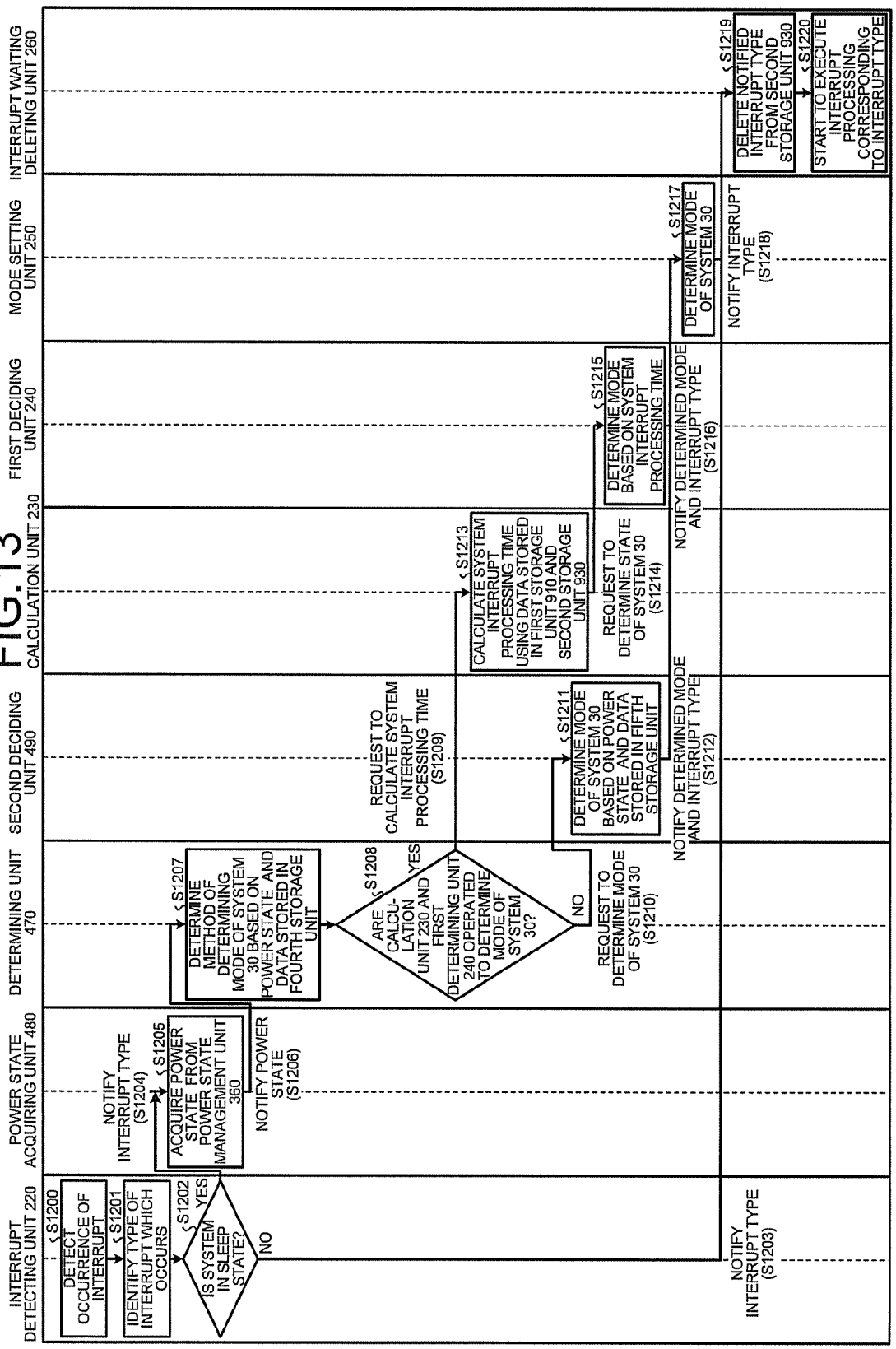

FIG.21

| POWER GENERATING TENDENCY | AMOUNT OF CHARGE | MODULE USED |
|---|---|---|
| INCREASE | LESS THAN FIRST THRESHOLD VALUE (40%) | SETTING INFORMATION ACQUIRING UNIT |
| INCREASE | OTHER RANGE | SECOND DECIDING UNIT |
| LITTLE CHANGE | EQUAL TO OR GREATER THAN SECOND THRESHOLD VALUE (50%) AND LESS THAN THIRD THRESHOLD VALUE (60%) | SETTING INFORMATION ACQUIRING UNIT |
| LITTLE CHANGE | OTHER RANGE | SECOND DECIDING UNIT |
| DECREASE | EQUAL TO OR GREATER THAN FOURTH THRESHOLD VALUE (70%) | SETTING INFORMATION ACQUIRING UNIT |
| DECREASE | OTHER RANGE | SECOND DECIDING UNIT |

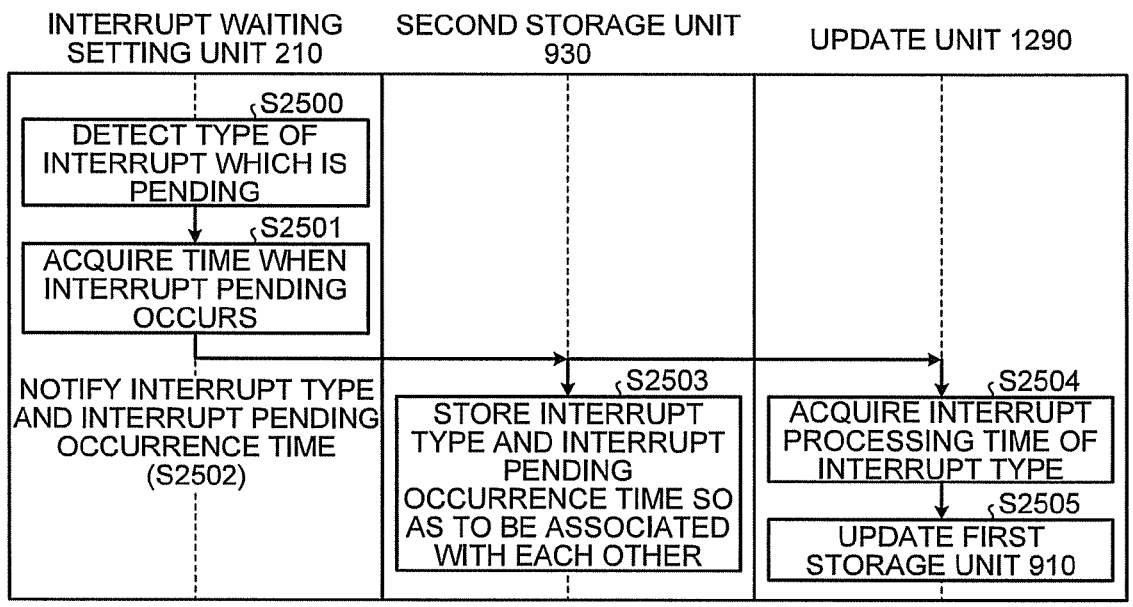

DEVICE FOR CALCULATING A TIME REQUIRED FOR SYSTEM PROCESSING AFTER THE SYSTEM RESUMES FROM SLEEP AND SETTING AN OPERATION MODE ACCORDINGLY

CROSS-REFERENCE TO RELATED APPLICATION(S)

This application is based upon and claims the benefit of priority from Japanese Patent Application No. 2012-010161, filed on Jan. 20, 2012; the entire contents of which are incorporated herein by reference.

FIELD

Embodiments described herein relate generally to a control device, a system, and a computer program product.

BACKGROUND

Various techniques have been proposed in order to reduce the power consumption of a system provided with, for example, a microprocessor. For example, the following technique has been known: a clock is set to a low speed in a sleep state (power saving state) in which the operation of the system is temporarily stopped, and then the clock is set to a high speed when the system resumes from the sleep state and executes a process.

However, in the technique according to the related art, the operation state of the system after resuming from the sleep state is set without any consideration for the time required for processing executed after the system resumes from the sleep state. Therefore, in some cases, it is difficult to appropriately reduce the power consumption of the system. For example, when the time required for the processing executed after the system resumes from the sleep state is short, the clock is set to a high speed although power required for the system is small, which results in unnecessary power consumption. Therefore, it is difficult to appropriately reduce power consumption.

BRIEF DESCRIPTION OF THE DRAWINGS

FIG. 3 is a diagram illustrating an example of data stored in a first storage unit according to the first embodiment;
FIG. 4 is a diagram illustrating an example of data stored in a second storage unit according to the first embodiment;
FIG. 11 is a diagram illustrating an example of data stored in a fourth storage unit according to the second embodiment;
FIG. 12 is a diagram illustrating an example of data stored in a fifth storage unit according to the second embodiment;
FIG. 13 is a sequence diagram illustrating an example of the sequence of the operation of the processor according to the second embodiment;
FIG. 21 is a diagram illustrating an example of data stored in a fourth storage unit according to the fourth embodiment;
FIG. 27 is a sequence diagram illustrating an example of the sequence of the operation of the processor according to the sixth embodiment;
FIG. 28 is a diagram illustrating an example of setting information stored in a third storage unit according to a modification.

DETAILED DESCRIPTION

According to an embodiment, a control device includes a calculator and a setting unit. The calculator is configured to calculate a system processing time indicating a time required for processing executed after a system, the system including a plurality of elements, power to each element being individually controlled, resumes from a sleep state in which the number of elements supplied with power is limited to a predetermined number and an operation of the system is stopped. The setting unit is configured to set a mode indicating an operation state of the system according to the system processing time calculated by the calculator when a resume factor indicating a factor for resuming the system from the sleep state occurs.

Various embodiments will be described in detail with reference to the accompanying drawings.

First Embodiment

Figure 1:
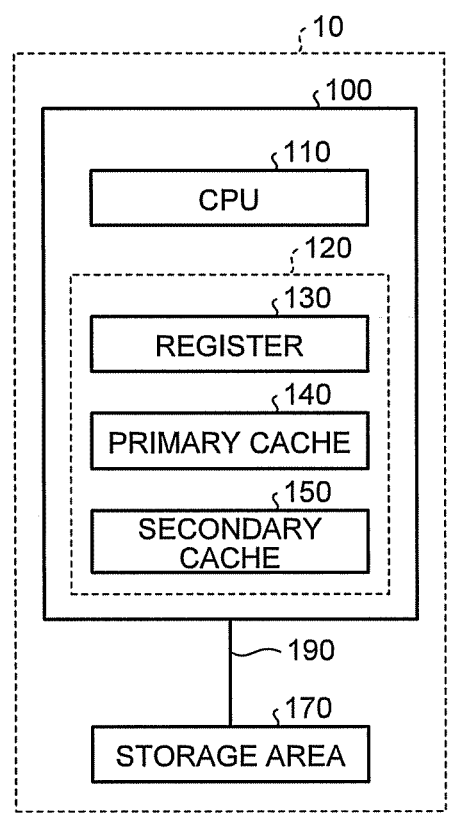
FIG. 1 is a block diagram illustrating an example of the structure of a system according to a first embodiment.

FIG. 1 is a block diagram illustrating an example of the structure of a target system (hereinafter, simply referred to as a "system") 10 according to this embodiment. As illustrated in FIG. 1, the system 10 includes a processor 100 and a storage area 170 which are connected to each other through a bus 190. It may be considered that the system 10 includes a plurality of elements. The power to each element is individually controlled. The element includes a component or a compartment of the component which can individually control power. For example, the element may include a compartment of an SOC (System On Chip) including the processor 100 and the storage area 170.

The processor 100 is a processing device which can execute one or a plurality of kinds of processing. As illustrated in FIG. 1, the processor 100 includes a CPU 110 and a storage unit 120. Specifically, the storage unit 120 includes a register 130 that stores therein various kinds of data and primary and secondary caches 140 and 150 that store, for example, data with a high frequency of use. The primary cache 140 stores data with a high frequency of use. The secondary cache 150 stores data with a high frequency of use which feeds the primary cache 140.

The storage area 170 stores therein, for example, programs or data used by the processor 100.

Figure 2:
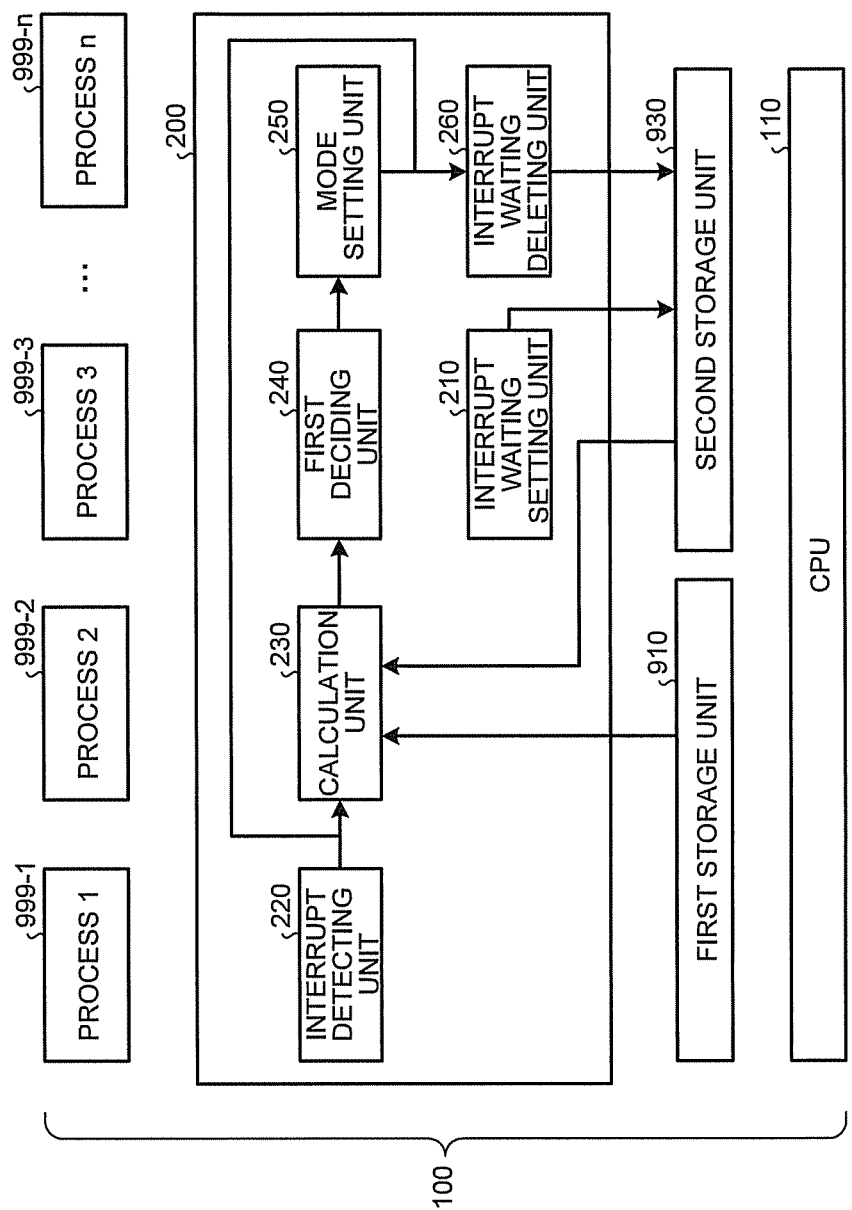
FIG. 2 is a block diagram illustrating an example of the functional structure of a processor according to the first embodiment.

FIG. 2 is a block diagram illustrating the structure of the functions implemented by the execution of an OS (operating system) 200, which is basic software, by the CPU 110 provided in the processor 100 and hardware components of the processor 100. It may be considered that a single OS 200 operates on the processor 100 and one or a plurality of processes (999-1 to 999-n) operate on the OS 200. In addition, in FIG. 2, the processor 100 includes the hardware components of the processor 100, the OS 200 which operates on the processor 100, and one or a plurality of processes which operate on the OS 200.

As illustrated in FIG. 2, the hardware components of the processor 100 include the CPU 110, a first storage unit 910, and a second storage unit 930. The first storage unit 910 stores therein an interrupt type indicating the type of interrupt, an interrupt latency indicating the time that elapses from when an interrupt waiting occurs to when an interrupt processing starts. Herein, the interrupt waiting indicates a state in which the processor 100 is waiting for the occurrence of an interrupt. The first storage unit 910 also stores therein an interrupt processing time indicating the time required for the interrupt processing so as to be associated with each other.

FIG. 3 is a diagram illustrating an example of data stored in the first storage unit 910. In the example illustrated in FIG. 3, the interrupt latency corresponding to device reading is set to T1_$m$ and the interrupt processing time corresponding to the device reading is set to T1_$s$. The interrupt latency corresponding to a keyboard input is set to T2_$m$ and the interrupt processing time corresponding to the keyboard input is set to T2_$s$. The interrupt latency corresponding to a timer is set to T3_$m$ and the interrupt processing time corresponding to the timer is set to T3_$s$. The interrupt latency corresponding to a mouse input is set to T4_$m$ and the interrupt processing time corresponding to the mouse input is set to T4_$s$.

Returning back to FIG. 2, the second storage unit 930 stores therein the interrupt type and an interrupt waiting occurrence time indicating the time at which interrupt waiting occurs so as to be associated with each other.

FIG. 4 is a diagram illustrating an example of data stored in the second storage unit 930. In the example illustrated in FIG. 4, the interrupt waiting occurrence time corresponding to the device reading is set to Ta. In addition, the interrupt waiting occurrence time corresponding to the keyboard input is set to Tb. The interrupt waiting occurrence time corresponding to the timer is set to Tc.

The description is continued with reference to FIG. 2 again. As illustrated in FIG. 2, the OS 200 includes an interrupt waiting setting unit 210, an interrupt detecting unit 220, a calculation unit 230, a first deciding unit 240, a mode setting unit 250, and an interrupt waiting deleting unit 260.

When a certain type of interrupt becomes interrupt waiting, the interrupt waiting setting unit 210 stores the type of interrupt being in an interrupt waiting state and the interrupt waiting occurrence time of the interrupt type in the second storage unit 930. When an interrupt processing starts, the interrupt waiting deleting unit 260 deletes the interrupt type corresponding to the interrupt processing and the interrupt waiting occurrence time corresponding to the interrupt type from the second storage unit 930, which will be described in detail below.

The interrupt detecting unit 220 detects the occurrence of an interrupt. Specifically, the interrupt detecting unit 220 receives an interrupt event (a signal indicating the occurrence of an interrupt) from the inside or outside of the processor 100 and identifies, from the interrupt event, the interrupt type corresponding to the interrupt processing to be started.

The calculation unit 230 calculates a system interrupt processing time indicating the time required until the interrupt processing executed after the system 10 resumes from the sleep state ends. Here, a state in which the number of elements supplied with power is limited to a predetermined number and the operation of the system 10 is stopped is referred to as the sleep state. In this embodiment, when an idle state (in other words, the idle state is regarded as a state in which the system 10 does not execute any processing) in which the CPU 110 does not execute any processing is maintained for a predetermined period, the system 10 goes into the sleep state. However, the embodiment is not limited thereto. The system 10 may go into the sleep state under any other conditions. When an interrupt occurs during the sleep state, the system 10 resumes from the sleep state and executes the interrupt processing. In this embodiment, an interrupt occurrence may be one resume factor.

In the first embodiment, the calculation unit 230 calculates, as the system interrupt processing time, the time required until the interrupt processing which is independently executed without overlapping with other interrupt processing immediately after the system 10 resumes from the sleep state ends or until a plurality kinds of interrupt processing which are executed so as to at least partially overlap each other immediately after the system 10 resumes from the sleep state end.

Figure 5:
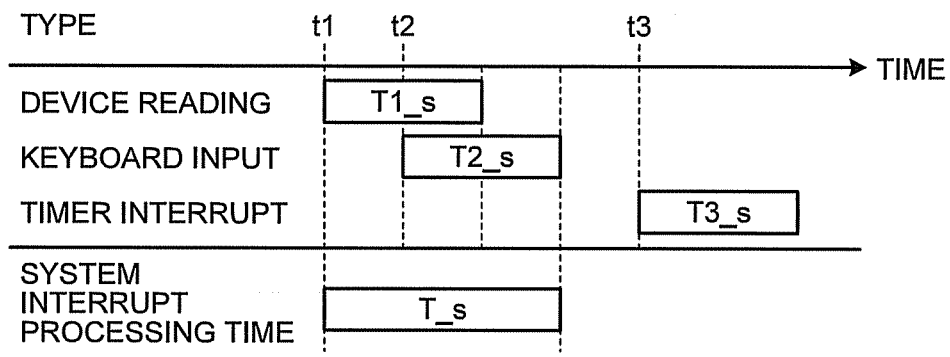
FIG. 5 is a diagram illustrating an example of the calculation of a system interrupt processing time according to the first embodiment.

It is assumed that, in the sleep state, three types of interrupts, that is, device reading, a keyboard input, and a timer interrupt are waiting. As illustrated in FIG. 5, the time when the interrupt processing is executed by the device reading is set to t1 and the interrupt processing time corresponding thereto is set to T1_$s$. The time when the interrupt processing is started by the keyboard input is set to t2 (>t1) and the interrupt processing time corresponding thereto is set to T2_s. The time when the interrupt processing is started by the timer interrupt is set to t3 (>t2) and the interrupt processing time corresponding thereto is set to T3_s. In the example illustrated in FIG. 5, it is assumed that the time at which the system 10 resumes from the sleep state (the time when an interrupt occurs due to the device reading) is t1 that is the time when the interrupt process is started by the device reading. A portion of the period during which the interrupt process is executed by the device reading overlaps a portion of the period during which the interrupt process is executed by the keyboard input. The period during which the interrupt process is executed by the timer interrupt does not overlap the period during which other interrupt processing is executed, but is independently set. Therefore, in the example illustrated in FIG. 5, the system interrupt processing time indicating the time required until the interrupt process executed after the system 10 resumes from the sleep state ends is the time when the interrupt processing by the device reading and the interrupt processing by the keyboard input are executed. That is, in the example illustrated in FIG. 5, the system interrupt processing time Ts is calculated as T2_s+(t2−t1).

The first deciding unit 240 illustrated in FIG. 2 determines the mode indicating the operation state of the system 10 after the system 10 resumes from the sleep state on the basis of the system interrupt processing time calculated by the calculation unit 230. The operation state of the system 10 indicates how the system 10 operates. Here, the operation state does not include the sleep state. In this example, there are a plurality of modes with different amounts of power consumption. The first deciding unit 240 determines any one of the plurality of modes as the mode of the system 10 after the system 10 resumes from the sleep state, on the basis of the system interrupt processing time calculated by the calculation unit 230. Each mode can be arbitrarily changed. For example, the following modes may be provided: a mode in which "power is supplied to the primary cache 140, but the supply of power to the secondary cache 150 is stopped"; a mode in which "the supply of power to each of the primary cache 140 and the secondary cache 150 is stopped"; a mode in which the supply of power to the other elements (for example, the storage area 170) is stopped; and a mode in which the voltage or clock frequency of the CPU 110 is set to a predetermined value.

The mode setting unit 250 illustrated in FIG. 2 sets the mode of the system 10 to the mode determined by the first deciding unit 240. In this way, the system 10 resumes from the sleep state and goes into the mode set by the mode setting unit 250.

Figure 6:
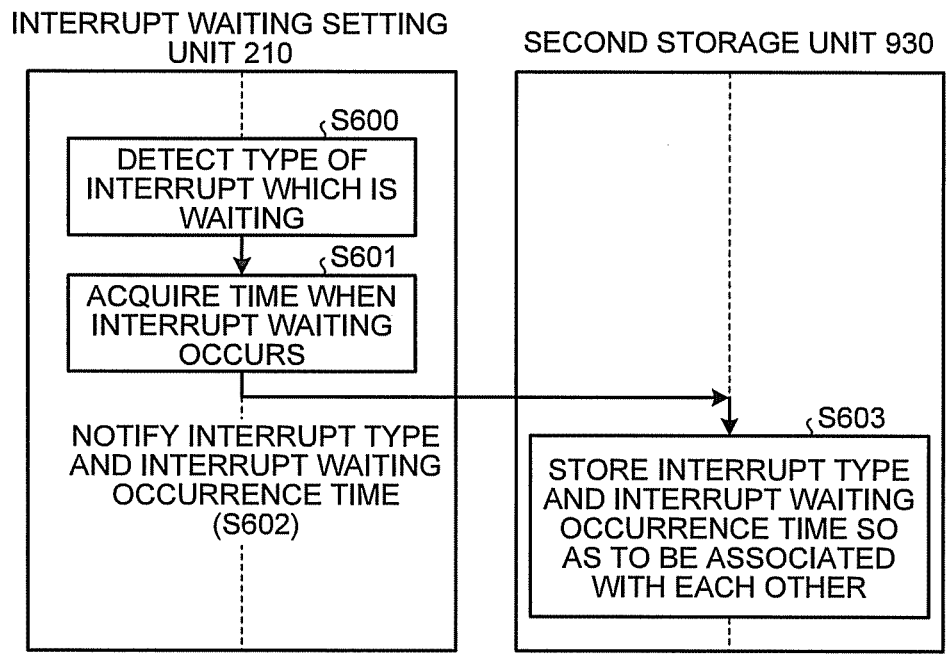
FIG. 6 is a sequence diagram illustrating an example of the sequence of the operation of the processor according to the first embodiment.

FIG. 6 is a sequence diagram illustrating an example of the sequence of the operation of the processor 100 when interrupt waiting occurs. For example, when a device (for example, a mouse or a keyboard) provided in the system 10 is in an interrupt waiting state, a event indicating the occurrence of interrupt waiting in the device is transmitted from, for example, a device driver to the interrupt waiting setting unit 210. The interrupt waiting setting unit 210 receives the event and, can detect the type of interrupt which is waiting (Step S600). When the type of interrupt which is waiting is detected, the interrupt waiting setting unit 210 acquires the interrupt waiting occurrence time (in this example, the time when the event is received) of the detected interrupt type (Step S601) and notifies the second storage unit 930 of the type of interrupt which is waiting and the interrupt waiting occurrence time (Step S602). The second storage unit 930 stores the interrupt type and the interrupt waiting occurrence time notified by the interrupt waiting setting unit 210 so as to be associated with each other (Step S603).

Figure 7:
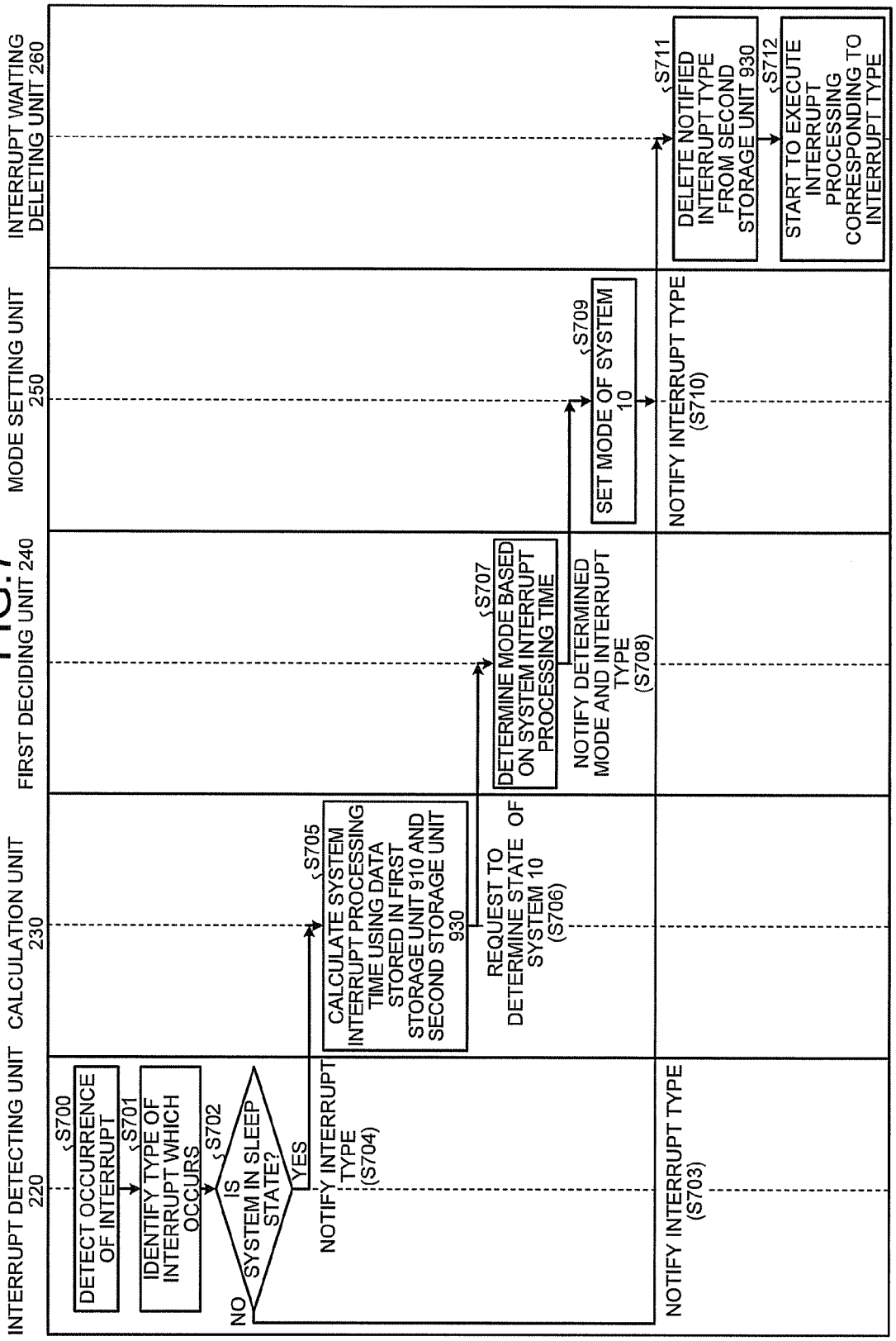
FIG. 7 is a sequence diagram illustrating an example of the sequence of the operation of the processor according to the first embodiment.

FIG. 7 is a sequence diagram illustrating an example of the sequence of the operation of the processor 100 until the interrupt processing starts after an interrupt occurs. As illustrated in FIG. 7, first, the interrupt detecting unit 220 receives an interrupt event from the inside or outside of the processor 100 and detects the occurrence of the interrupt (Step S700). Then, the interrupt detecting unit 220 identifies, from the received interrupt event, the interrupt type (the interrupt type corresponding to the interrupt processing to be started) of the interrupt which occurs (Step S701). Then, the interrupt detecting unit 220 detects whether or not the system is in the sleep state (Step S702). When the system is in the sleep state (YES in Step S702), the interrupt detecting unit 220 notifies the calculation unit 230 of the identified interrupt type (Step S704). On the other hand, when the system 10 is not in the sleep state (NO in Step S702), the interrupt detecting unit 220 notifies the interrupt waiting deleting unit 260 of the identified interrupt type (Step S703). After Step S703, the process proceeds to Step S711. The content of Step S711 will be described below.

When receiving, from the interrupt detecting unit 220, a event indicating the type (the interrupt type corresponding to the interrupt processing to be started) of interrupt which occurs, the calculation unit 230 calculates the system interrupt processing time using data stored in the first storage unit 910 and the second storage unit 930 (Step S705). In other words, the calculation unit 230 calculates the system interrupt processing time when the interrupt occurs in the sleep state. If necessary, the calculation unit 230 calculates the system interrupt processing time indicating the time required until the interrupt processing executed after the system 10 resumes from the sleep state ends.

Figure 8:
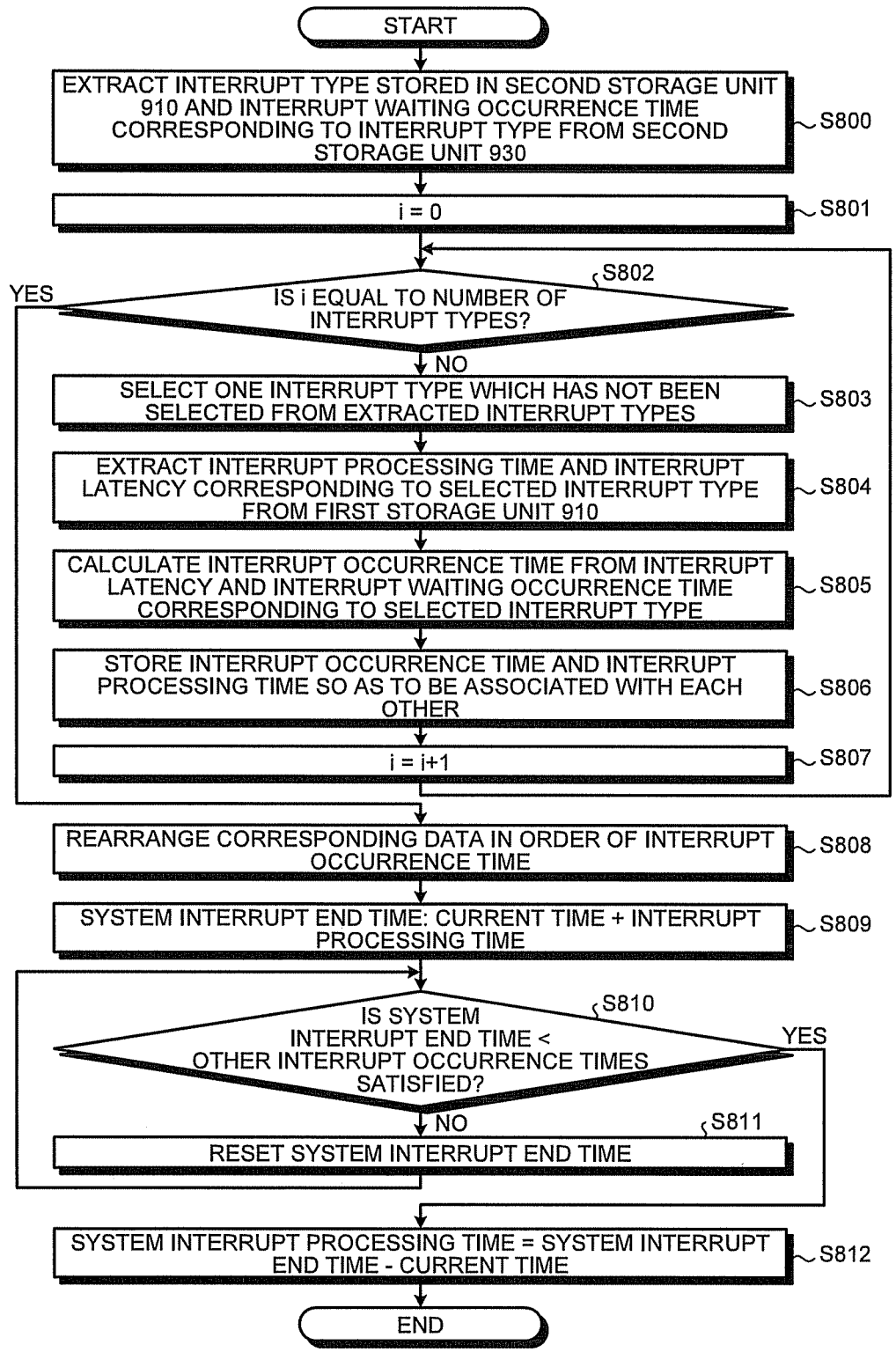
FIG. 8 is a flowchart illustrating an example of the operation of a calculation unit according to the first embodiment.

FIG. 8 is a flowchart illustrating an example of the calculation of the system interrupt processing time by the calculation unit 230. As illustrated in FIG. 8, first, the calculation unit 230 extracts the interrupt type and the interrupt waiting occurrence time corresponding to the interrupt type from the second storage unit 930 (Step S800). Then, the calculation unit 230 initializes the measured value of the counter to "0" (Step S801). The calculation unit 230 executes the following Steps S802 to S806 for all of the interrupt types extracted in Step S800 and makes a correspondence table between the interrupt occurrence time (the time when the interrupt processing starts) and the interrupt processing time, which will be described in detail below.

After Step S801, the calculation unit 230 determines whether or not the measured value i of the counter reaches a value indicating the total number of interrupt types extracted in Step S800 (Step S802). When the measured value of the counter does not reach the value indicating the total number of extracted interrupt types (NO in Step S802), the calculation unit 230 selects one interrupt type which has not been selected from the interrupt types extracted in Step S800 (Step S803). Then, the calculation unit 230 extracts the interrupt latency and the interrupt processing time corresponding to the interrupt type selected in Step S803 from the first storage unit 910 (Step S804). Then, the calculation unit 230 calculates the interrupt occurrence time (the time when the interrupt processing starts) from the interrupt waiting occurrence time and the interrupt latency corresponding to the interrupt type selected in Step S803 (Step S805). Specifically, the calculation unit 230 calculates a time after the lapse of the interrupt latency from the interrupt waiting occurrence time as the interrupt occurrence time. Then, the calculation unit 230 stores data (referred to as "corresponding data") in which the interrupt occurrence time calculated in Step S805 is associated with the interrupt processing time (the interrupt processing time extracted in Step S804) corresponding to the interrupt type selected in Step S803 (Step S806). Then, the calculation unit 230 increases the measured value i of the counter by one (Step S807). Then, the process proceeds to Step S802 again.

In Step S802, when the measured value i of the counter reaches the value indicating the total number of interrupt types extracted in Step S800 (YES in Step S802), the calculation unit 230 rearranges the corresponding data in the order of the interrupt occurrence time (Step S808).

Then, the calculation unit 230 sets a time after the lapse of the interrupt processing time corresponding to the notified interrupt type from the current time (in this example, the time when the occurrence of the interrupt is detected) as the time (referred to as a "system interrupt end time") when the interrupt processing executed after the system resumes from the sleep state ends (Step S809).

Then, the calculation unit 230 determines whether or not the system interrupt end time is earlier than the interrupt occurrence time of other interrupt types in which the occurrence of an interrupt is not detected (Step S810). When it is determined that the system interrupt end time is earlier than the interrupt occurrence time of other interrupt types (YES in Step S810), the calculation unit 230 calculates the time period from the current time to the system interrupt end time as the system interrupt processing time (Step S812). On the other hand, when it is determined that the system interrupt end time is later than the interrupt occurrence time of other interrupt types (NO in Step S810), the calculation unit 230 resets the system interrupt end time (Step S811). Specifically, the calculation unit 230 selects the interrupt type with the earliest interrupt occurrence time among the interrupt types with the interrupt occurrence time earlier than the current system interrupt end time and resets the time after the lapse of the interrupt processing time of the selected interrupt type from the interrupt occurrence time of the selected interrupt type as the system interrupt end time. Then, the process returns to Step S810 again.

Returning to FIG. 7 again, the calculation unit 230 notifies the first deciding unit 240 of the calculated system interrupt processing time and the interrupt type (the type of interrupt which occurs) notified by the interrupt detecting unit 220 and requests the first deciding unit 240 to determine the mode of the system 10 after resuming from the sleep state (Step S706). The first deciding unit 240 determines the mode of the system 10 after resuming from the sleep state on the basis of the system interrupt processing time notified by the calculation unit 230 (Step S707). Specifically, the first deciding unit 240 determines the mode of the system 10 such that, as the system interrupt processing time increases, the number of elements to operate (the number of elements supplied with power) increases. Next, an example of a mode determining method will be described. For example, when the system interrupt processing time notified by the calculation unit 230 is equal to or less than a first reference value, a first mode in which the minimum number of elements in the system 10 is operated (power consumption is the minimum) may be determined as the mode of the system 10. In the first mode, for example, the voltage or frequency may be set to a minimum value and the supply of power to each of the primary cache 140 and the secondary cache 150 may be stopped. For example, when the system interrupt processing time notified by the calculation unit 230 is equal to or greater than a second reference value greater than the first reference value, a second mode in which all elements of the system 10 are operated (power consumption is the maximum) may be determined as the mode of the system 10. In the second mode, for example, power may be supplied to all elements. However, the embodiment is not limited thereto. A mode in which, as the system interrupt processing time increases, power consumption increases may be determined as the mode of the system 10. The first deciding unit 240 notifies the mode setting unit 250 of the determined mode of the system 10 and the type of interrupt which occurs (Step S708).

The mode setting unit 250 sets the mode of the system 10 to the mode notified by the first deciding unit 240 (Step S709). In this way, the system 10 resumes from the sleep state and goes into the mode set by the mode setting unit 250. Then, the mode setting unit 250 notifies the interrupt waiting deleting unit 260 of the type of interrupt which occurs (Step S710). Then, the interrupt waiting deleting unit 260 deletes the interrupt type notified by the mode setting unit 250 among the interrupt types stored in the second storage unit 930 and the interrupt waiting occurrence time corresponding to the interrupt type from the second storage unit 930 (Step S711). In this way, when interrupt waiting occurs, the type of interrupt which is waiting and the interrupt waiting occurrence time indicating the time when the interrupt waiting occurs are stored in the second storage unit 930 so as to be associated with each other. When the interrupt waiting is deleted (when an interrupt occurs), the type of interrupt whose waiting state is deleted and the interrupt waiting occurrence time corresponding to the interrupt type are deleted from the second storage unit 930. In this way, it is possible to appropriately manage the current interrupt waiting conditions. Then, the interrupt waiting deleting unit 260 starts to execute the interrupt processing corresponding to the interrupt type notified by the mode setting unit 250 (Step S712).

When the system 10 is operated in the first mode (minimum set), it is possible to reduce the power consumption of the system 10, but overhead is increased by, for example, processing for temporarily stopping the system 10. In addition, power consumption caused by the influence of such processing (for example, an increase in the processing time due to a reduction in the voltage or frequency or an increase in the number of accesses to the memory due to the non-operation of the cache) is not negligible. Therefore, in some cases, power consumption when the system 10 is operated in the first mode is more than that when the system 10 is operated in other modes (for example, the second mode), according to the value of the system interrupt processing time (the time required until the interrupt processing executed after the system 10 resumes from the sleep state ends).

In this embodiment, the mode of the system 10 is set according to the system interrupt processing time. Specifically, since the system 10 is set to the mode in which, as the system interrupt processing time increases, power consumption increases, it is possible to effectively reduce the power consumption of the system 10 while maintaining the appropriate processing time. Therefore, according to the first embodiment, it is possible to effectively reduce the power consumption of the system.

In the first embodiment, when an interrupt occurs in the sleep state, the mode of the system 10 is set according to the processing time. Therefore, even when the processing time is determined after the interrupt occurs, it is possible to effectively reduce power consumption. For example, in a case in which an interrupt is controlled by a control device provided outside the processor 100, before the system goes into the sleep state, it is difficult to accurately estimate the processing time after the interrupt occurs in the sleep state. Therefore, it is necessary to determine the mode of the system 10 immediately after an interrupt occurs. In this case, the structure according to the first embodiment can be applied to effectively reduce power consumption.

Second Embodiment

A second embodiment differs from the first embodiment in that the calculation unit 230 and the first deciding unit 240 are not operated and a function which can set the mode according to the power state of a power source is provided. Hereinafter, the detailed content of the second embodiment will be described. In the second embodiment, the same components as those in the first embodiment are denoted by the same reference numerals and the description thereof will not be repeated.

Figure 9:
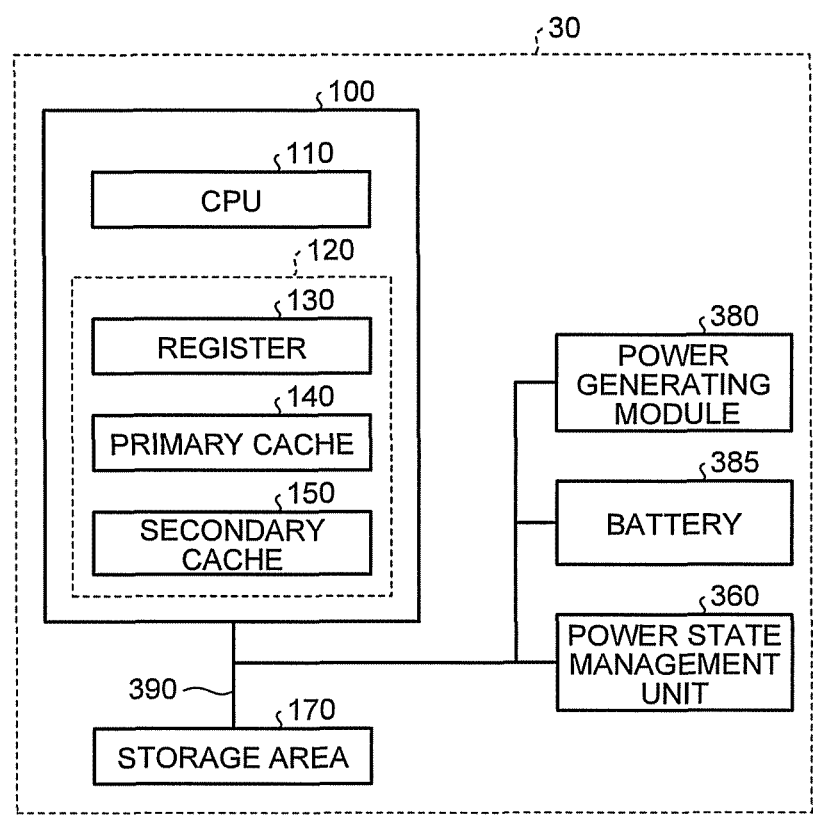
FIG. 9 is a block diagram illustrating an example of the structure of a system according to a second embodiment.

FIG. 9 is a block diagram illustrating an example of the structure of a system 30 according to the second embodiment. As illustrated in FIG. 9, the system 30 includes a processor 100, a storage area 170, a power state management unit 360, a power generating module 380, and a battery 385 which are connected to each other by a bus 390. It may be considered that the power generating module 380 and the battery 385 form the power source of the system 30.

The power generating module 380 generates power required to operate the system 30. For example, a structure which generates power using sunlight, such as a solar panel, may be used as the power generating module 380. The battery 385 stores power required to operate the system 30.

The power state management unit 360 manages the power state of the power source. For example, the power state of the power source includes: at least one of the amount of power generated by the power generating module 380; a power generation tendency which is calculated from the amount of power generated and indicates a tendency to an increase or decrease in the amount of power generated; the charging capacity of the battery 385; and a charging tendency which is calculated from the charging capacity and indicates a tendency to an increase or decrease in the charging capacity. The power state management unit 360 stores the previous amount of power generated and compares the previous amount of power generated with the current amount of power generated to check the power generation tendency. In addition, the power state management unit 360 stores the previous charging capacity and compares the previous charging capacity with the current charging capacity to check the charging tendency.

Figure 10:
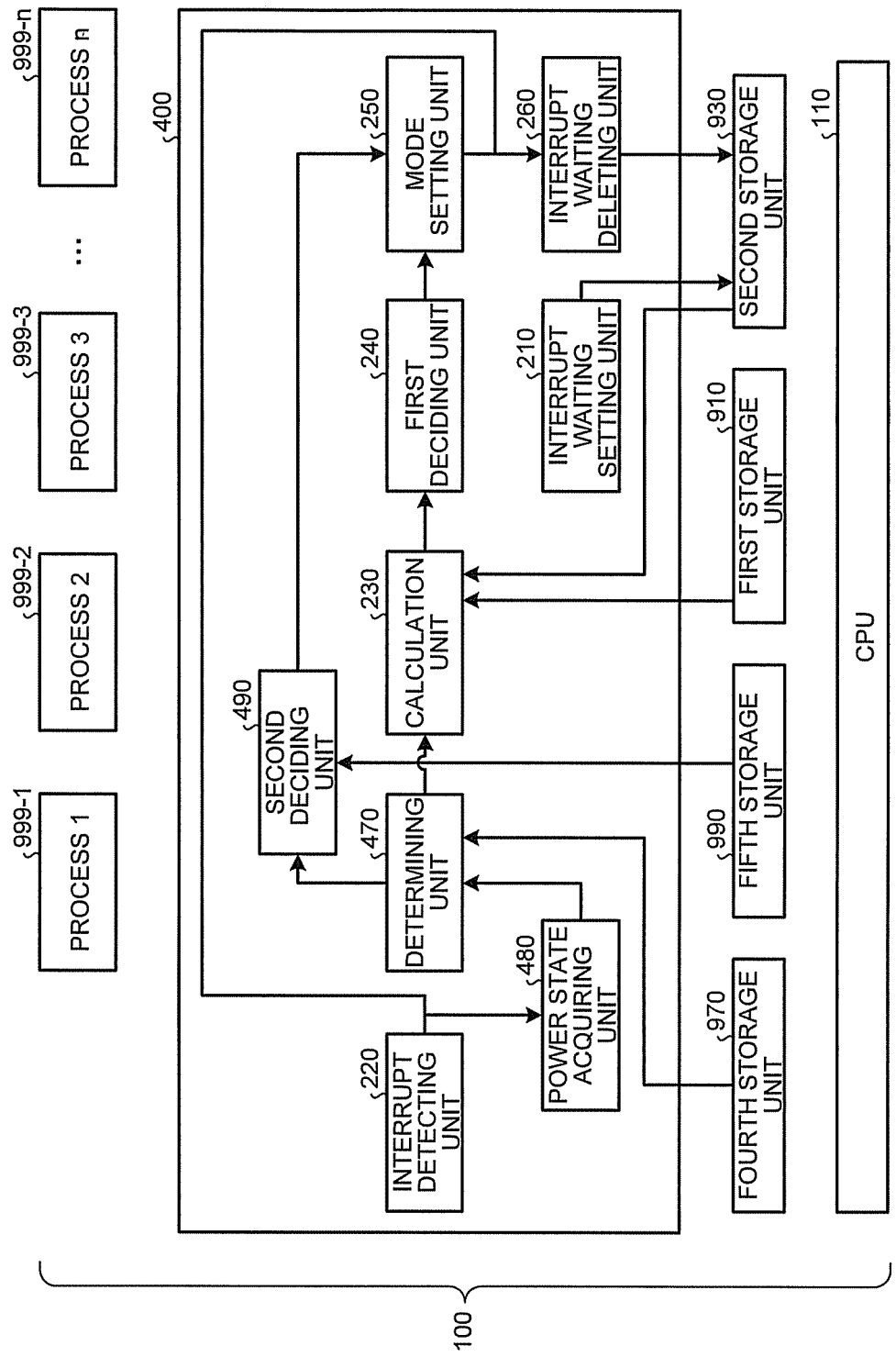
FIG. 10 is a block diagram illustrating an example of the functional structure of a processor according to the second embodiment.

FIG. 10 is a block diagram illustrating the structure of the functions implemented by the execution of an OS (operating system) 400, which is basic software, by a CPU 110 provided in the processor 100 and hardware components of the processor 100. As illustrated in FIG. 10, the hardware components of the processor 100 includes the CPU 110, a first storage unit 910, a second storage unit 930, a fourth storage unit 970, and a fifth storage unit 990. In addition, in FIG. 10, the processor 100 includes the hardware components of the processor 100, the OS 400 which operates on the processor 100, and one or a plurality of processes which operate on the OS 400.

FIG. 11 is a diagram illustrating an example of data stored in the fourth storage unit 970. In the example illustrated in FIG. 11, the fourth storage unit 970 stores therein the power generation tendency, the amount of charge, and a determining unit used to determine the mode of the system 30 so as to be associated with each other. That is, it may be considered that the fourth storage unit 970 stores the power state of the power source and a mode determining method so as to be associated with each other. In FIG. 11, when the power generation tendency indicates an increase in the amount of power generated and the amount of charge is less than a first threshold value (for example, 40%), the calculation unit 230 and the first deciding unit 240 are to be operated. When the power generation tendency indicates an increase in the amount of power generated and the amount of charge is equal to or greater than the first threshold value, a second deciding unit 490, which will be described below, is to be operated.

Furthermore, when the power generation tendency indicates little change and the amount of charge is equal to or greater than a second threshold value (for example, 50%) and is less than a third threshold value (for example, 60%) greater than the second threshold value, the calculation unit 230 and the first deciding unit 240 are to be operated. For example, when the power generation tendency indicates little change and the amount of charge is equal to or greater than the third threshold value, the second deciding unit 490 is to be operated.

Furthermore, when the power generation tendency indicates a decrease in the amount of power generated and the amount of charge is equal to or greater than a fourth threshold value (for example, 70%), the calculation unit 230 and the first deciding unit 240 are to be operated. When the power generation tendency indicates a decrease in the amount of power generated and the amount of charge is less than the fourth threshold value, the second deciding unit 490 is to be operated.

However, the embodiment is not limited thereto. The fourth storage unit 970 may store, for example, the amount of charge and the determining unit used so as to be associated with each other, or it may store a variation in the amount of power generated and the determining unit used so as to be associated with each other. For example, when the amount of charge is equal to or greater than the fifth threshold value and is less than a sixth threshold value greater than the fifth threshold value, the calculation unit 230 and the first deciding unit 240 may be used. In the other cases, the second deciding unit 490 may be used. For example, when an increase in the amount of power generated is less than a seventh threshold value or the absolute value of a decrease in the amount of power generated is less than an eighth threshold value (which may be different from or the same as the seventh threshold value), the calculation unit 230 and the first deciding unit 240 may be used. In the other cases, the second deciding unit 490 may be used.

FIG. 12 is a diagram illustrating an example of data stored in the fifth storage unit 990. In the example illustrated in FIG. 12, the fifth storage unit 990 stores therein the power generation tendency, the amount of charge, and the mode of the system 30 so as to be associated with each other. That is, it may be considered that the fifth storage unit 990 stores the power state of the power source and the mode of the system 30 so as to be associated with each other. In FIG. 12, when the power generation tendency indicates an increase in the amount of power generated and the amount of charge is equal to or greater than a ninth threshold value (for example, 30%), the second mode is selected. In the other cases, the first mode is selected. When the power generation tendency indicates little change and the amount of charge is equal to or greater than a tenth threshold value (for example, 50%), the second mode is selected. In the other cases, the first mode is selected. When the power generation tendency indicates a decrease in the amount of power generated and the amount of charge is equal to or greater than an eleventh threshold value (for example, 70%), the second mode is selected. In the other cases, the first mode is selected.

The embodiment is not limited thereto. The fifth storage unit 990 may store, for example, the amount of charge and the mode of the system 30 so as to be associated with each other, or it may store a variation in the amount of power generated and the mode of the system 30 so as to be associated with each other. For example, when the amount of charge is equal to or greater than a twelfth threshold value, the second mode may be selected. When the amount of charge is less than the twelfth threshold value, the first mode may be selected. In addition, for example, when an increase in the amount of power generated is equal to or greater than a thirteenth threshold value, the second mode may be selected. When the increase in the amount of power generated is equal to or less than the thirteenth threshold value, the first mode may be selected.

The description is continued with reference to FIG. 10 again. As illustrated in FIG. 10, the OS 400 includes an interrupt waiting setting unit 210, an interrupt detecting unit 220, a power state acquiring unit 480, a determining unit 470, a second deciding unit 490, a calculation unit 230, a first deciding unit 240, a mode setting unit 250, and an interrupt waiting deleting unit 260.

The power state acquiring unit 480 acquires the power state of the power source from the power state management unit 360 and notifies the determining unit 470 of the power state. The determining unit 470 selects a determining unit for determining the mode of the system 30 on the basis of the data stored in the fourth storage unit 970. The second deciding unit 490 determines the mode of the system 30 according to the power state of the power source, which will be described in detail below.

FIG. 13 is a sequence diagram illustrating an example of the sequence of the operation of the processor 100 until an interrupt processing starts from the occurrence of an interrupt. First, the interrupt detecting unit 220 receives an interrupt event from the inside and outside of the processor 100 and detects the occurrence of the interrupt (Step S1200). Then, the interrupt detecting unit 220 identifies the type of interrupt which occurs from the received interrupt event (Step S1201). Then, the interrupt detecting unit 220 detects whether or not the system 30 is in the sleep state (Step S1202). When the system 30 is in the sleep state (YES in Step S1202), the interrupt detecting unit 220 notifies the power state acquiring unit 480 of the identified interrupt type (Step S1204). On the other hand, when the system 30 is not in the sleep state (NO in Step S1202), the interrupt detecting unit 220 notifies the interrupt waiting deleting unit 260 of the identified interrupt type (Step S1203). After Step S1203, the process proceeds to Step S1219. The processes after Step S1219 are the same as the processes after Step S711 in FIG. 7 and thus the description thereof will not be repeated.

When receiving the event indicating the type of interrupt which occurs from the interrupt detecting unit 220, the power state acquiring unit 480 acquires the power state from the power state management unit 360 (Step S1205). Then, the power state acquiring unit 480 notifies the determining unit 470 of the acquired power state (Step S1206).

When receiving the event indicating the power state from the power state acquiring unit 480, the determining unit 470 determines a method of determining the mode of the system 30 on the basis of the power state and the values stored in the fourth storage unit 970 (Step S1207). In the example illustrated in FIG. 11, the determining unit 470 determines whether to operate the calculation unit 230 and the first deciding unit 240 so as to determine the mode of the system 30, or to operate the second deciding unit 490 so as to determine the mode of the system 30, on the basis of the power state acquired from the power state acquiring unit 480 and the data stored in the fourth storage unit 970. Next, an example of the method of determining the mode of the system 30 will be described with reference to FIG. 11. For example, the following determining methods are used. When the power generation tendency obtained from the power state acquiring unit 480 indicates an increase in the amount of power generated and the amount of charge is 30%, the calculation unit 230 and the first deciding unit 240 are operated to determine the mode of the system 30. That is, in this case, the determining unit 470 selects the calculation unit 230 and the first deciding unit 240 as the determining unit for determining the mode of the system 30. Alternatively, when the power generation tendency obtained from the power state acquiring unit 480 indicates little change and the amount of charge is 80%, the second deciding unit 490 is operated to determine the mode of the system 30. That is, in this case, the determining unit 470 selects the second deciding unit 490 as the determining unit for determining the mode of the system 30.

When the determining unit 470 makes a determination to use a method of determining the mode of the system 30 without operating the calculation unit 230 and the first deciding unit 240 (NO in Step S1208), that is, when the determining unit 470 makes a determination to use the method of operating the second deciding unit 490 to determine the mode of the system 30, the determining unit 470 notifies the second deciding unit 490 of the power state and requests it to determine the mode of the system 30 (Step S1210). The second deciding unit 490 determines the mode of the system 30 on the basis of the current power state (the power state acquired by the power state acquiring unit 480) of the power source transmitted from the determining unit 470 and the values stored in the fifth storage unit 990 (Step S1211). Hereinafter, a method of determining the mode of the system 30 when the fifth storage unit has the structure illustrated in FIG. 12 will be described. When the power generation tendency indicates an increase in the amount of power generated and the amount of charge is 50% in the power state transmitted from the determining unit 470, the second mode in which all elements of the system 30 are operated may be determined as the mode of the system 30. In addition, for example, when the power generation tendency indicates little change and the amount of charge is 80%, the second mode may be determined as the mode of the system 30. The second deciding unit 490 may determine, as the mode of the system 30, the first mode in which the minimum number of elements in the system 30 is operated. For example, when the power generation tendency indicates a decrease in the amount of power generated and the amount of charge is 50%, the second deciding unit 490 may determine, as the mode of the system 30, the first mode.

Then, the second deciding unit 490 notifies the mode setting unit 250 of the determined mode and the type of interrupt which occurs (Step S1212). The mode setting unit 250 sets the mode of the system 30 to the mode notified by the first deciding unit 240 or the second deciding unit 490 (Step S1217). In this way, the system 30 resumes from the sleep state and goes into the mode set by the mode setting unit 250.

When a determination is made to operate the calculation unit 230 and the first deciding unit 240 to determine the mode of the system 30 (YES in Step S1208), the determining unit 470 notifies the calculation unit 230 of the type of interrupt which occurs and requests the calculation unit 230 to calculate the system interrupt processing time (Step S1209). The processes after Step S1213 are the same as the processes after Step S705 in FIG. 7 and thus the description thereof will not be repeated.

As described above, in the second embodiment, the system 30 is operated in the optimal state according to the power state of the power source when an interrupt occurs in the sleep state. Therefore, it is possible to execute the process while effectively reducing the power consumption of the system 30. As described above, according to the method of setting the mode of the system 30 on the basis of the system interrupt processing time, thereby reducing power consumption, it is possible to reduce the power consumption of the processor 100, but power consumption caused by overhead due to a process for changing the mode of the system 30 is not negligible. In the first state in which the amount of power generated or the amount of charge is sufficient, it is effective to neglect the power consumption in order to reduce the processing time. However, in the second state in which the amount of power generated or the amount of charge is not sufficient, it is considered that it is appropriate to operate the system 30 with a minimum set in terms of the operation of the system 30. In addition, when the amount of power generated or the amount of charge is in a third state between the first state and the second state, it is considered that it is appropriate to operate the system 30 in the mode corresponding to the system interrupt processing time. That is, in the second embodiment, the mode of the system 30 is set considering the power state of the power source including, for example, the amount of power generated, the amount of charge, the power generation tendency, and the charging tendency. Therefore, it is possible to effectively reduce power consumption while maintaining the processing time suitable for the power conditions of the system 30.

Third Embodiment

In the first embodiment, when an interrupt occurs in the sleep state, the system interrupt processing time is calculated. However, a third embodiment differs from the first embodiment in that the system interrupt processing time is calculated before the system goes into the sleep state. Hereinafter, the detailed content of the third embodiment will be described. In the third embodiment, the same components as those in the first embodiment are denoted by the same reference numerals and the description thereof will not be repeated. The system according to the third embodiment has the same basic structure as that according to the first embodiment. In the following description, the system according to the third embodiment is represented by the reference numeral 50.

Figure 14:
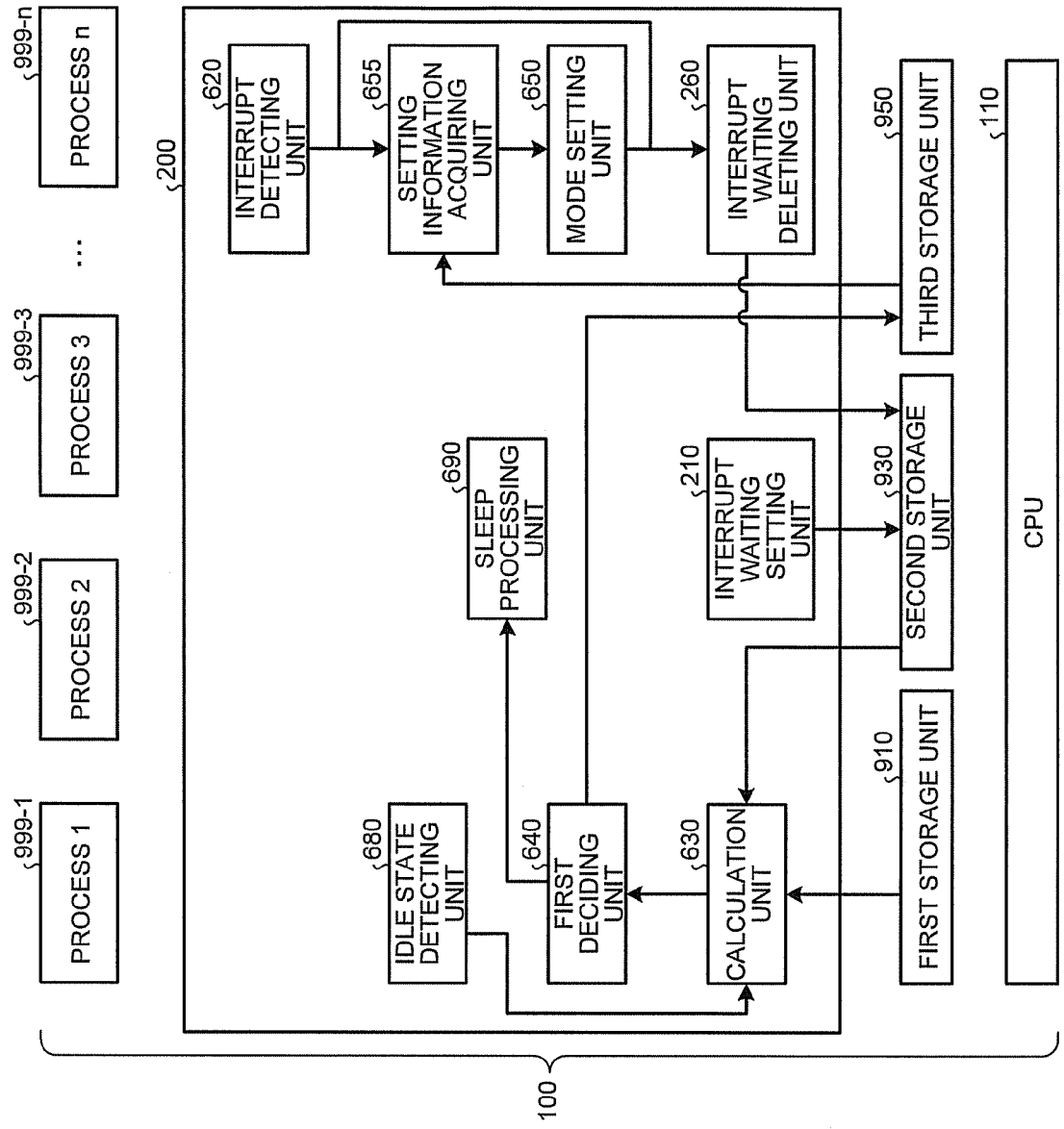
FIG. 14 is a block diagram illustrating an example of the functional structure of a processor according to a third embodiment.

FIG. 14 is a block diagram illustrating the structure of the functions implemented by the execution of an OS (operating system) 600, which is basic software, by a CPU 110 provided in a processor 100 and hardware components of the processor 100. It may be considered that a single OS 600 operates on the processor 100 and one or a plurality of processes (999-1 to 999-$n$) operate on the OS 600. In addition, in FIG. 14, the processor 100 includes the hardware components of the processor 100, the OS 600 which operates on the processor 100, and one or a plurality of processes which operate on the OS 600.

Figures 15, 16:
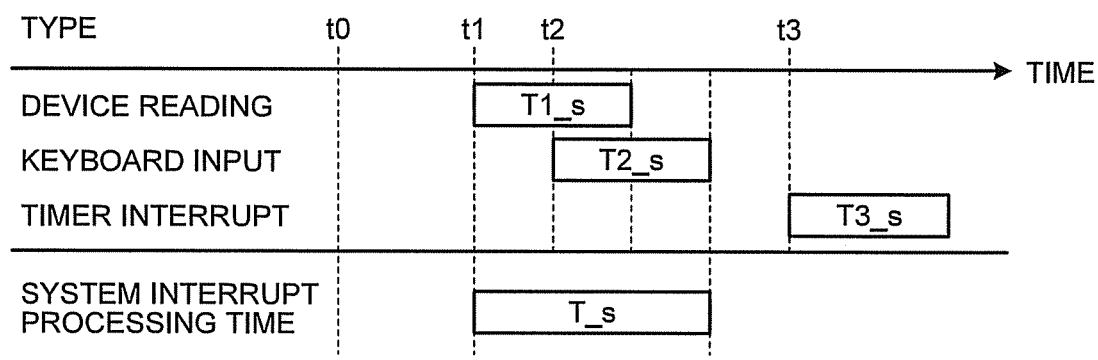
FIG. 15 is a diagram illustrating an example of data stored in a third storage unit according to the third embodiment.
FIG. 16 is a diagram illustrating an example of the calculation of a system interrupt processing time according to the third embodiment.

As illustrated in FIG. 14, the hardware components of the processor 100 include the CPU 110, a first storage unit 910, a second storage unit 930, and a third storage unit 950. The third storage unit 950 stores therein the setting information of the system 50 (information for setting the mode of the system 50) which is registered before the system 50 goes into the sleep state and is read when the system 50 resumes from the sleep state. FIG. 15 is a diagram illustrating an example of the setting information stored in the third storage unit 950. In the example illustrated in FIG. 15, as the registered setting information, the followings are stored: the value of the voltage of the processor 100; the value of the frequency (the number of clocks); information as to whether power is supplied to a primary cache 140; and information as to whether power is supplied to a secondary cache 150. In the example illustrated in FIG. 15, the following settings are used: the value of the voltage of the processor 100 is Vx; the value of the frequency is Fx; power is supplied to the primary cache 140 (ON); and the supply of power to the secondary cache 150 is stopped (OFF). For example, when the system resumes from the sleep state in the settings, it is difficult to use the secondary cache 150 after the system resumes from the sleep state since power is supplied to the primary cache 140, but the supply of power to the secondary cache 150 is stopped.

Returning back to FIG. 14, the OS 600 includes an interrupt waiting setting unit 210, an idle state detecting unit 680, a calculation unit 630, a first deciding unit 640, a sleep processing unit 690, an interrupt detecting unit 620, a mode setting unit 650, a setting information acquiring unit 655, and an interrupt waiting deleting unit 260. The idle state detecting unit 680 detects an idle state. In the idle state, the CPU 110 does not execute any processing.

When the idle state detecting unit 680 detects the idle state, the calculation unit 630 calculates a system interrupt processing time indicating the time until a process executed after the system 50 resumes from the sleep state ends, using the data stored in the first storage unit 910 and the second storage unit 930. Similarly to the first embodiment, the system interrupt processing time according to the third embodiment indicates the time required until an interrupt process which is independently executed without overlapping other interrupt processes immediately after the system 50 resumes from the sleep state or until a plurality of kinds of interrupt processing which are executed so as to at least partially overlap each other immediately after the system 50 resumes from the sleep state end. The third embodiment differs from the first embodiment in that the interrupt waiting setting unit 210 checks the interrupt waiting occurrence time of each interrupt type in advance and writes the interrupt type and the interrupt waiting occurrence time to the second storage unit 930 so as to be associated with each other. That is, in the third embodiment, the correspondence between the interrupt type and the interrupt waiting occurrence time is written to the second storage unit 930 in advance.

FIG. 16 illustrates an example of the method of the calculation unit 630 calculating the system interrupt processing time using the first storage unit 910 and the second storage unit 930. In the example illustrated in FIG. 14, three types of interrupts, that is, device reading, a keyboard input, and a timer interrupt are waiting. As illustrated in FIG. 16, the time when the interrupt processing is started by the device reading is set to t1 and the interrupt processing time corresponding thereto is set to T1_$s$. The time when the interrupt processing is started by the keyboard input is set to t2 (>t1) and the interrupt processing time corresponding thereto is set to T2_$s$. The time when the interrupt processing is started by the timer interrupt is set to t3 (>t2) and the interrupt processing time corresponding thereto is set to T3_$s$. As can be seen from the example illustrated in FIG. 16, an interrupt occurs due to the device reading immediately after the system 50 resumes from the sleep state and an interrupt occurs due to the keyboard input during an interrupt process. Therefore, in this case, the system interrupt processing time is the time for which the interrupt processing due to the device reading and the interrupt processing due to the keyboard input are executed. That is, in the example illustrated in FIG. 16, the system interrupt processing time Ts is T2_$s$+(t2−t1).

Returning to FIG. 14 again, the first deciding unit 640 determines the mode of the system 50 after the system 50 resumes from the sleep state on the basis of the system interrupt processing time calculated by the calculation unit 630 and writes the setting information for setting the system to the determined mode to the third storage unit 950.

The sleep processing unit 690 saves data stored in the register 130, the primary cache 140, and the secondary cache 150 of the processor 100 to the storage area 170 and temporarily stops the operation of the processor 100 such that the processor is in a power saving state (sleep state).

The interrupt detecting unit 620 detects an interrupt event from the inside or outside of the processor 100 and notifies the setting information acquiring unit 655 of the interrupt type identified by the interrupt event.

When receiving the event indicating the interrupt type from the interrupt detecting unit 620, the setting information acquiring unit 655 reads the setting information stored in the third storage unit 950 and notifies the mode setting unit 650 of the setting information and the interrupt type. When receiving the event from the setting information acquiring unit 655, the mode setting unit 650 sets the mode of the system 50 on the basis of the notified setting information.

Figure 17:
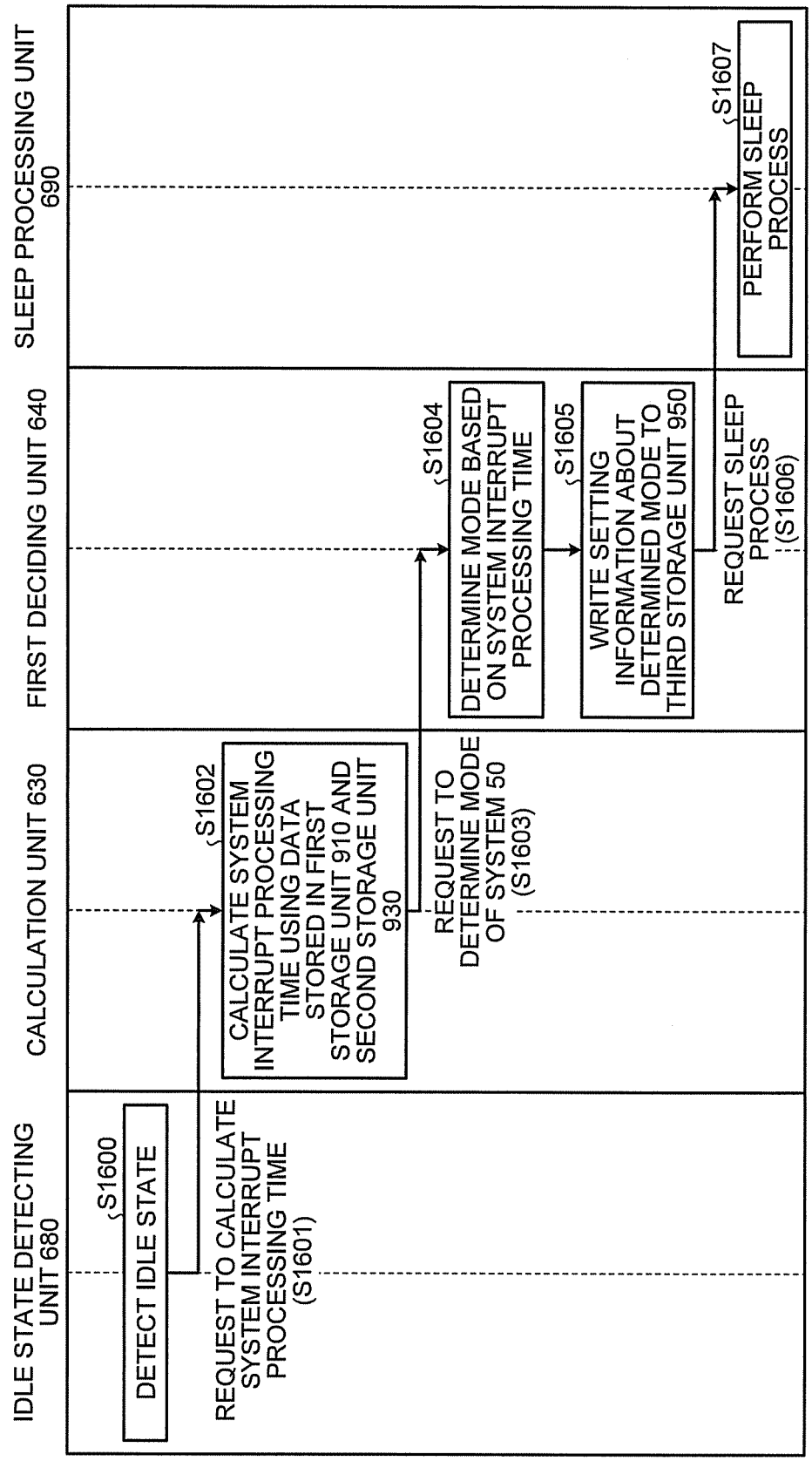
FIG. 17 is a sequence diagram illustrating an example of the sequence of the operation of the processor according to the third embodiment.

FIG. 17 is a sequence diagram illustrating an example of the sequence of the operation of the processor 100 until the processor goes into the sleep state after the idle state is detected. As illustrated in FIG. 17, first, the idle state detecting unit 680 detects the idle state of the processor 100 (Step S1600) and requests the calculation unit 630 to calculate the system interrupt processing time (Step S1601). When receiving the request, the calculation unit 630 calculates the system interrupt processing time using the data stored in the first storage unit 910 and the second storage unit 930 (Step S1602).

Figure 18:
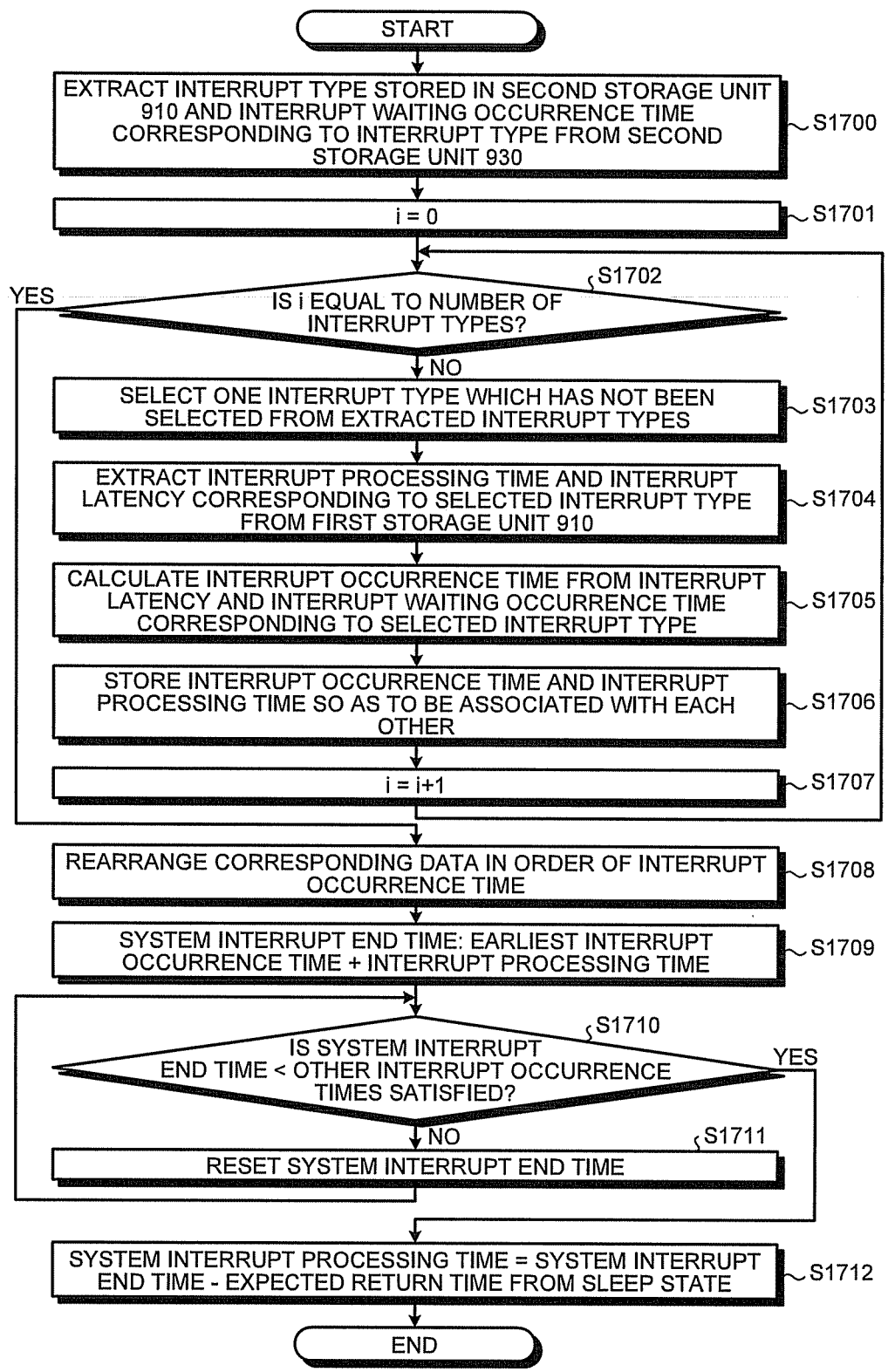
FIG. 18 is a flowchart illustrating an example of the operation of a calculation unit according to the third embodiment.

FIG. 18 is a flowchart illustrating an example of the calculation of the system interrupt processing time by the calculation unit 630. The contents of Steps S1700 to S1708 are the same as those of Steps S800 to S808 in FIG. 8 and the detailed description thereof will not be repeated. In Step S1709 after Step S1708, the calculation unit 630 sets, as the system interrupt end time, a time after the lapse of the interrupt processing time of the interrupt type from the interrupt occurrence time (referred to as "the earliest interrupt occurrence time") of the interrupt type with the earliest interrupt occurrence time among the types of interrupts which occur after the processor resumes from the sleep state.

Then, the calculation unit 630 determines whether or not the current system interrupt end time is earlier than the interrupt occurrence time of other interrupt types (Step S1710). When it is determined that the system interrupt end time is earlier than the interrupt occurrence time of other interrupt types (YES in Step S1710), the calculation unit 630 calculates, as the system interrupt processing time, the time period from the expected resume time from the sleep state (that is, the earliest interrupt occurrence time) to the system interrupt end time (Step S1712). On the other hand, when it is determined that the system interrupt end time is later than the interrupt occurrence time of other interrupt types (NO in Step S1710), the calculation unit 630 resets the system interrupt end time (Step S1711). Specifically, the calculation unit 630 selects the interrupt type with the earliest interrupt occurrence time among the interrupt types with the interrupt occurrence time earlier than the current system interrupt end time and resets, as the system interrupt end time, a time after the lapse of the interrupt processing time of the selected interrupt type from the interrupt occurrence time of the selected interrupt type. Then, the process returns to Step S1710 again.

Returning to FIG. 17 again, the calculation unit 630 notifies the first deciding unit 640 of the calculated system interrupt processing time and requests the first deciding unit 640 to determine the mode of the system 50 after resuming from the sleep state (Step S1603). The first deciding unit 640 determines the mode of the system 50 after resuming from the sleep state on the basis of the system interrupt processing time notified by the calculation unit 630 (Step S1604). The contents of Step S1604 are the same as those of Step S707 in FIG. 7. Then, the first deciding unit 640 writes the setting information about the determined mode to the third storage unit 950 (Step S1605). Then, the first deciding unit 640 requests the sleep processing unit 690 to execute a sleep processing for changing the system 50 to the sleep state (Step S1606).

The sleep processing unit 690 requested to execute the sleep processing executes the sleep processing in the current mode of the system 50 (Step S1607). For example, when power is supplied to the primary cache 140, the sleep processing unit 690 saves the data stored in the primary cache 140 to the storage area 170. For example, when power is supplied to the secondary cache 150, the sleep processing unit 690 saves the data stored in the secondary cache 150 to the storage area 170. Then, the sleep processing unit 690 saves the data stored in the register 130 to the storage area 170 and temporarily stops the operation of the processor 100. In this way, the system 50 goes into the power saving state (sleep state).

Figure 19:
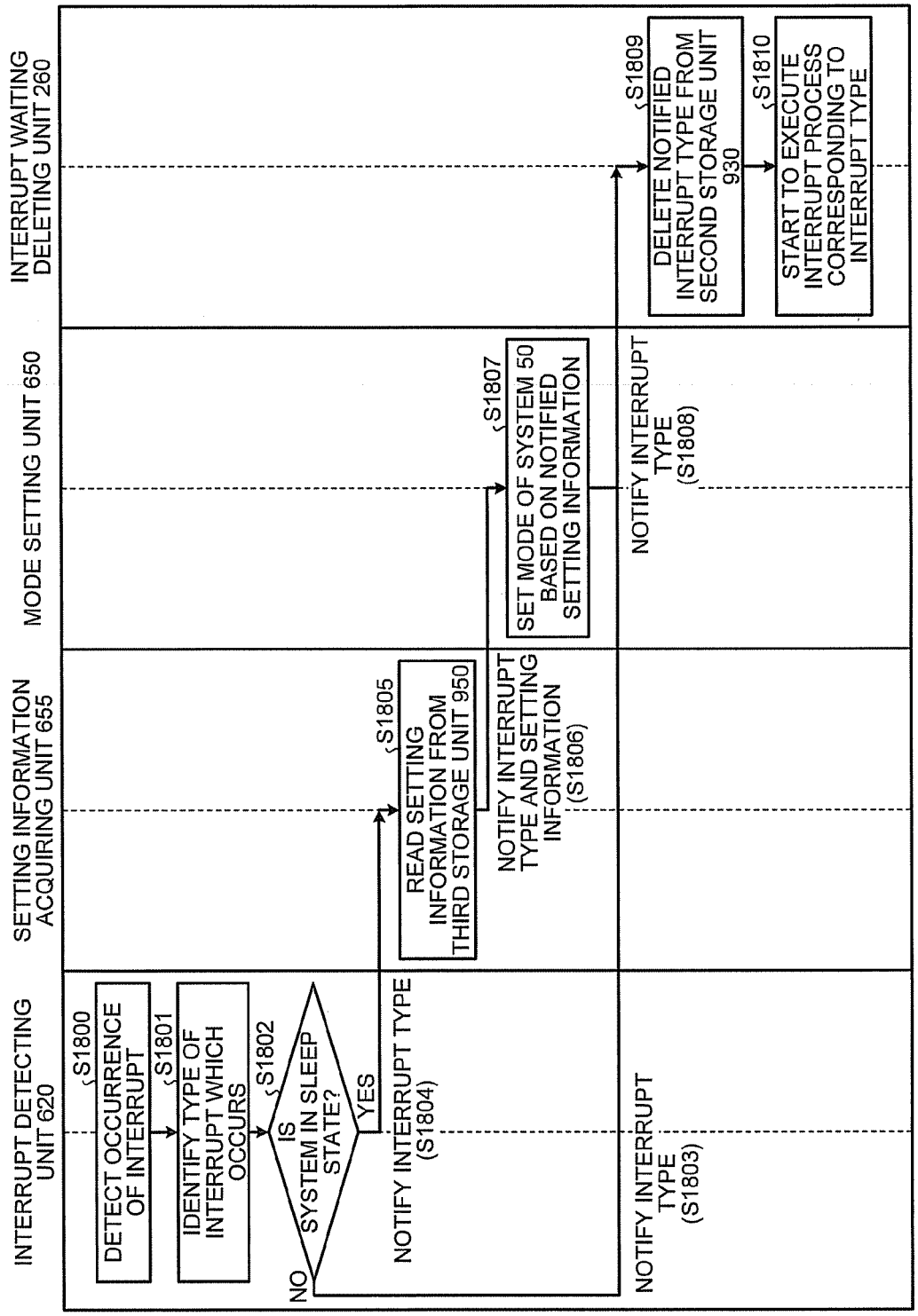
FIG. 19 is a sequence diagram illustrating an example of the sequence of the operation of the processor according to the third embodiment.

FIG. 19 is a sequence diagram illustrating an example of the sequence of the operation of the processor 100 until the interrupt processing starts after an interrupt occurs. As illustrated in FIG. 19, first, the interrupt detecting unit 220 receives an interrupt event from the inside or outside of the processor 100 and detects the occurrence of the interrupt (Step S1800). Then, the interrupt detecting unit 220 identifies, from the received interrupt event, the type (the interrupt type in which the interrupt processing starts) of the interrupt which occurs (Step S1801). Then, the interrupt detecting unit 220 detects whether or not the system 50 is in the sleep state (Step S1802). When the system 50 is in the sleep state (YES in Step S1802), the interrupt detecting unit 220 notifies the setting information acquiring unit 655 of the identified interrupt type (Step S1804). On the other hand, when the system 50 is not in the sleep state (NO in Step S702), the interrupt detecting unit 220 notifies the interrupt waiting deleting unit 260 of the identified interrupt type (Step S1803). After Step S1803, the process proceeds to Step S1809. The processes after Step S1809 are the same as the processes after Step S711 in FIG. 7 and thus the detailed description thereof will not be repeated.

When receiving, from the interrupt detecting unit 620, the event indicating the type of interrupt which occurs, the setting information acquiring unit 655 reads the setting information written to the third storage unit 950 (Step S1805). Then, the setting information acquiring unit 655 notifies the mode setting unit 650 of the read setting information and the interrupt type (Step S1806). The mode setting unit 650 sets the mode of the system 50 on the basis of the setting information notified by the setting information acquiring unit 655 (Step S1807). As in the example illustrated in FIG. 15, when data "primary cache: ON and secondary cache: OFF" is written to the third storage unit 950, the mode setting unit 650 starts the supply of power to the primary cache 140 and executes initialization. On the other hand, the mode setting unit 650 does not supply power to the secondary cache 150. Then, the mode setting unit 650 notifies the interrupt waiting deleting unit 260 of the type of interrupt which occurs (Step S1808). The processes after Step S1808 are the same as the processes after Step S710 in FIG. 7 and thus the detailed description thereof will not be repeated.

As in the first embodiment, in the method of calculating the system interrupt processing time when an interrupt occurs in the sleep state and determining the mode after the system resumes from the sleep state, the system interrupt processing time needs to be calculated in a state in which no unit is initialized when the system resumes from the sleep state, which results in an increase in the time required for calculation or the power consumption of the processor 100. For example, it is considered that, since the voltage or frequency is maintained at the value in the sleep state and no power is supplied to the primary cache 140 or the secondary cache 150 immediately after the system resumes from the sleep state, a memory access certainly occurs. In contrast, in the third embodiment, before the system goes into the sleep state (before the system is stopped), the system interrupt processing time is calculated. Therefore, it is possible to calculate the system interrupt processing time under the optimal conditions. Before the system goes into the sleep state, the state of each of the voltage, the frequency, the primary cache 140, and the secondary cache 150 is substantially the same as that in the mode in which the system operates normally. Therefore, it is possible to calculate the system interrupt processing time under the conditions suitable for calculating the system interrupt processing time. That is, according to the third embodiment, it is possible to calculate the system interrupt processing time while effectively reducing the power consumption of the system.

Fourth Embodiment

Similarly to the second embodiment, a fourth embodiment differs from the third embodiment in that it has a function of setting the mode according to the power state of the power source. Hereinafter, the detailed content of the fourth embodiment will be described. In the fourth embodiment, the same components as those in the second embodiment and the third embodiment are denoted by the same reference numerals and the description thereof will not be repeated. A system according to the fourth embodiment has the same basic structure as that according to the second embodiment. In the following description, the system according to the fourth embodiment is represented by the reference numeral 70.

Figure 20:
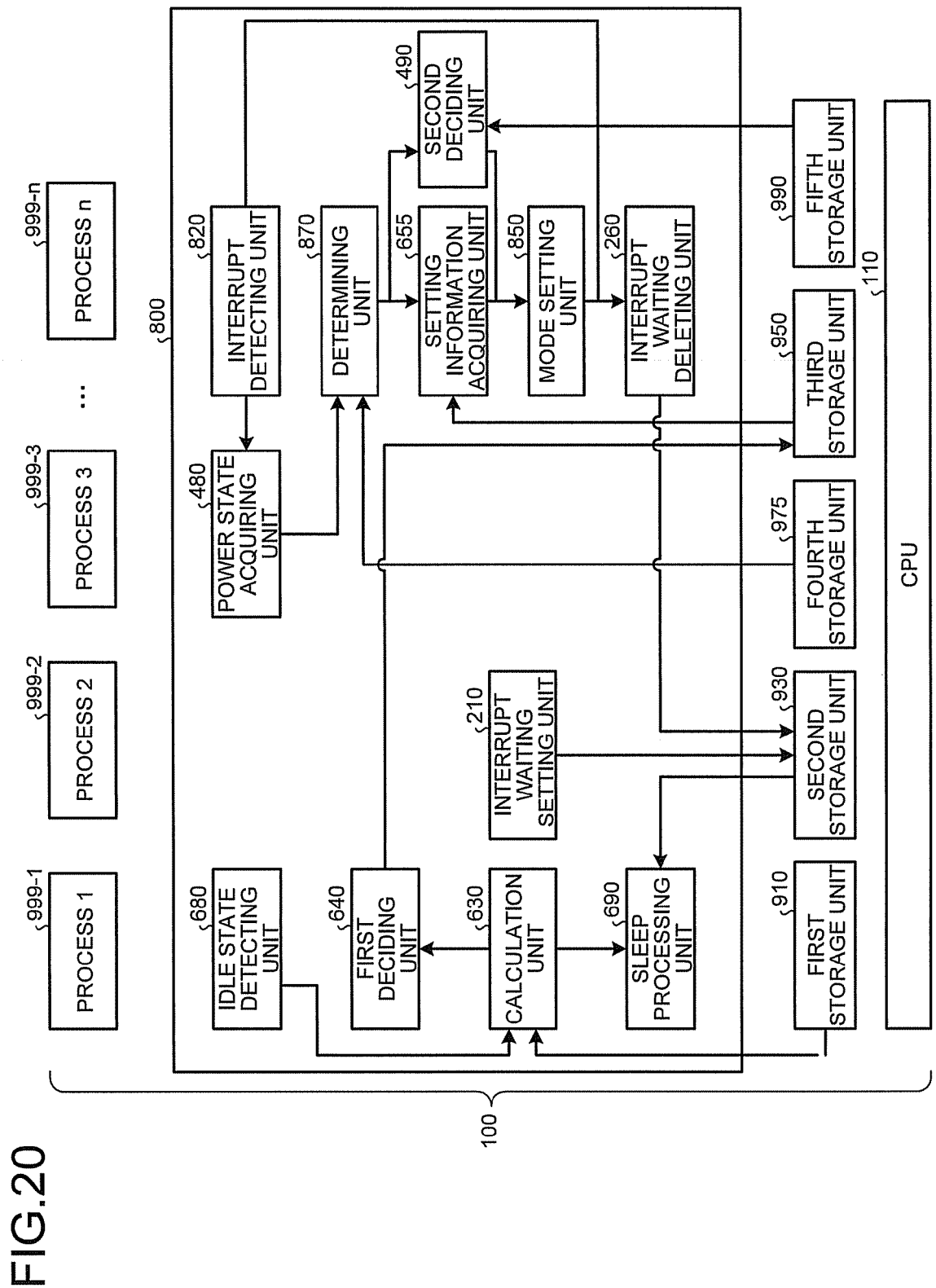
FIG. 20 is a block diagram illustrating an example of the functional structure of a processor according to a fourth embodiment.

FIG. 20 is a block diagram illustrating the structure of the functions implemented by the execution of an operating system (OS) 800, which is basic software, by a CPU 110 provided in a processor 100 and hardware components of the processor 100. As illustrated in FIG. 20, the hardware components of the processor 100 include the CPU 110, a first storage unit 910, a second storage unit 930, a third storage unit 950, a fourth storage unit 975, and a fifth storage unit 990. In FIG. 20, the processor 100 includes the hardware components of the processor 100, the OS 800 which operates on the processor 100, and one or a plurality of processes which operate on the OS 800.

FIG. 21 is a diagram illustrating an example of data stored in the fourth storage unit 975. In the example illustrated in FIG. 21, the fourth storage unit 975 stores therein a power generation tendency, the amount of charge, and a module used to determine the mode so as to be associated with each other. Similarly to the second embodiment, it may be considered that the fourth storage unit 975 stores the power state of the power source and a mode determining method so as to be associated with each other. In FIG. 21, when the power generation tendency indicates an increase in the amount of power generated and the amount of charge is less than a first threshold value (for example, 40%), a setting information acquiring unit 655 is used to determine the mode of the system 70. That is, the mode is determined using the setting information acquired from the setting information acquiring unit 655. When the power generation tendency indicates an increase in the amount of power generated and the amount of charge is equal to or greater than the first threshold value, the mode determined by the second deciding unit 490 is used.

When the power generation tendency indicates little change and the amount of charge is equal to or greater than a' second threshold value (for example, 50%) and is less than a third threshold value (for example, 60%) greater than the second threshold value, the mode is determined using the setting information acquired from a setting information acquiring unit 655. For example, when the power generation tendency indicates little change and the amount of charge is equal to or greater than the third threshold value, the mode determined by the second deciding unit 490 is used.

When the power generation tendency indicates a decrease in the amount of power generated and the amount of charge is equal to or greater than a fourth threshold value (for example, 70%), the mode is determined using the setting information acquired from the setting information acquiring unit 655. When the power generation tendency indicates a decrease in the amount of power generated and the amount of charge is less than the fourth threshold value, the mode determined by the second deciding unit 490 is used. However, the embodiment is not limited thereto. Similarly to the fourth storage unit 970, the fourth storage unit 975 may store, for example, the amount of charge and the module used so as to be associated with each other, or it may store a variation in the amount of power generated and the module used so as to be associated with each other.

The description is continued with reference to FIG. 20 again. As illustrated in FIG. 20, the OS 800 includes an interrupt waiting setting unit 210, an idle state detecting unit 680, a calculation unit 630, a first deciding unit 640, a sleep processing unit 690, an interrupt detecting unit 820, a power state acquiring unit 480, a determining unit 870, a second deciding unit 490, the setting information acquiring unit 655, a mode setting unit 850, and an interrupt waiting deleting unit 260.

The interrupt detecting unit 820 detects an interrupt event from the inside or outside of the processor 100 and notifies the power state acquiring unit 480 of the interrupt type identified by the interrupt event.

The determining unit 870 determines a method of determining the mode of the system 70 on the basis of the data store in the fourth storage unit 975. In the fourth embodiment, when an interrupt occurs in the sleep state, the power state acquiring unit 480 acquires the power state from the power state management unit 360 and notifies the determining unit 870 of the acquired power state. The determining unit 870 selects the module used to determine the mode of the system 70 on the basis of the power state acquired from the power state acquiring unit 480 and the data stored in the fourth storage unit 975. For example, when the setting information acquiring unit 655 is selected as the module used to determine the mode, the determining unit 870 requests the setting information acquiring unit 655 to extract the setting information from the third storage unit 950. Then, the setting information acquiring unit 655 acquires the setting information stored in the third storage unit 950 and notifies the mode setting unit 850 of the setting information. When the second deciding unit 490 is selected as the module used to determine the mode, the determining unit 870 requests the second deciding unit 490 to determine the mode. This determining method is the same as that in the second embodiment.

The mode setting unit 850 sets the mode of the system 70 on the basis of the setting information notified by the setting information acquiring unit 655 or the second deciding unit 490.

Figure 22:
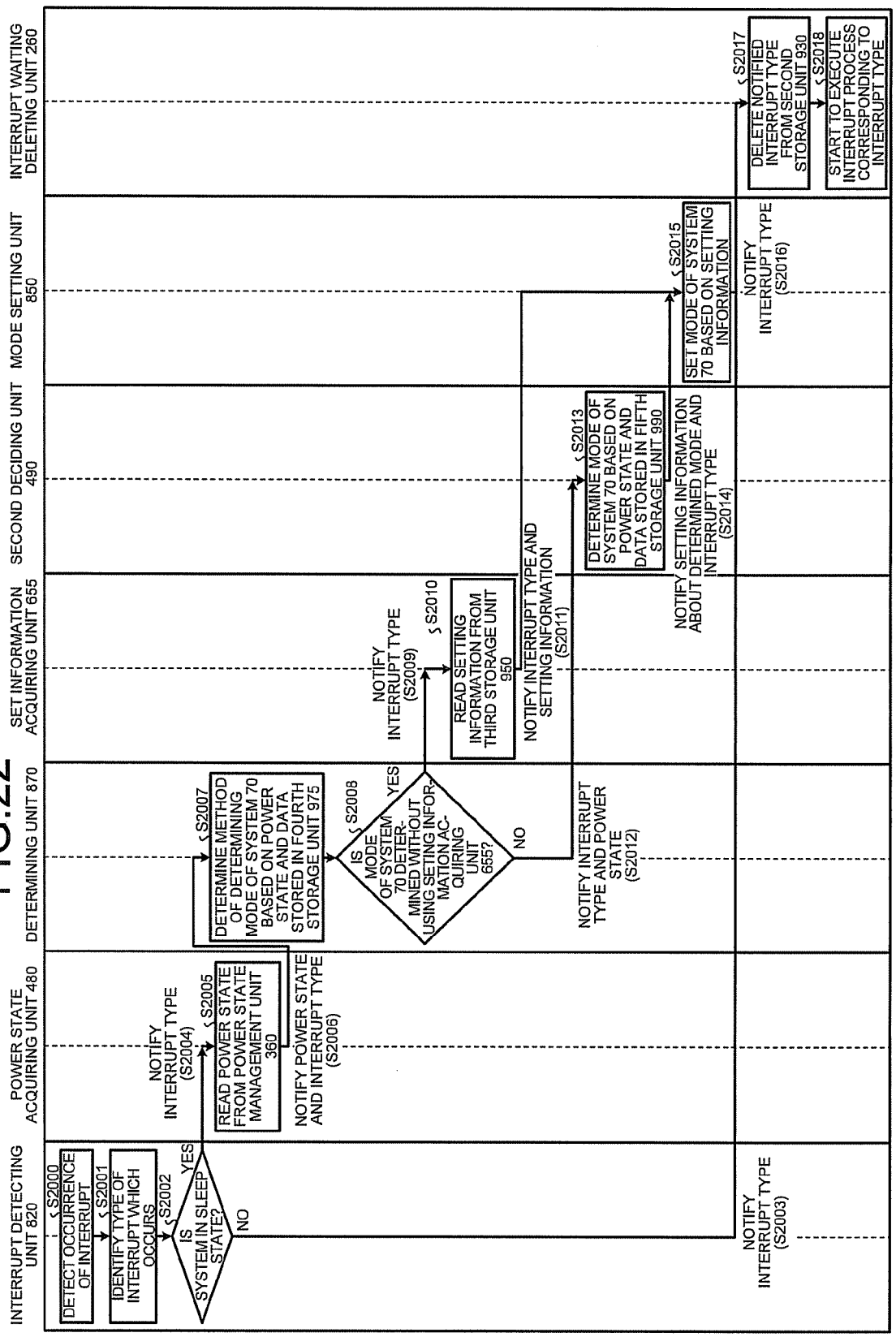
FIG. 22 is a sequence diagram illustrating an example of the sequence of the operation of the processor according to the fourth embodiment.

FIG. 22 is a sequence diagram illustrating an example of the sequence of the operation of the processor 100 until the interrupt processing starts after an interrupt occurs. First, when receiving an interrupt event from the inside and outside of the processor 100, the interrupt detecting unit 820 detects the occurrence of the interrupt (Step S2000). Then, the interrupt detecting unit 820 identifies the interrupt type (the interrupt type in which the interrupt processing starts) corresponding to the interrupt which occurs from the received interrupt event (Step S2001). Then, the interrupt detecting unit 820 detects whether or not the system 70 is in the sleep state (Step S2002). When the system 70 is in the sleep state (YES in Step S2002), the interrupt detecting unit 820 notifies the power state acquiring unit 480 of the identified interrupt type (Step S2004). On the other hand, when the system 70 is not in the sleep state (NO in Step S2002), the interrupt detecting unit 820 notifies the interrupt waiting deleting unit 260 of the identified interrupt type (Step S2003). After Step S2003, the process proceeds to Step S2017. The processes after Step S2017 are the same as the processes after Step S711 in FIG. 7 and thus the detailed description thereof will not be repeated.

When receiving the event indicating the type of interrupt which occurs from the interrupt detecting unit 820, the power state acquiring unit 480 acquires the power state from the power state management unit 360 (Step S2005). Then, the power state acquiring unit 480 notifies the determining unit 870 of the interrupt type and the power state (Step S2006).

The determining unit 870 determines a method of determining the mode of the system 70 on the basis of the power state acquired from the power state acquiring unit 480 and the data stored in the fourth storage unit 975 (Step S2007). In the example illustrated in FIG. 21, the determining unit 870 determines whether to operate the setting information acquiring unit 655 to determine the mode of the system 70 (in other words, whether to determine the mode of the system 70 using the setting information stored in the third storage unit 950) or to operate the second deciding unit 490 to determine the mode of the system 70, on the basis of the power state acquired from the power state acquiring unit 480 and the data stored in the fourth storage unit 975. An example of the method of determining the mode of the system 70 will be described with reference to FIG. 21. For example, when the power generation tendency obtained from the power state acquiring unit 480 indicates an increase in the amount of power generated and the amount of charge is 30%, the determining unit 870 selects the setting information acquiring unit 655 as the module used to determine the mode of the system 70. That is, in this case, the determining unit 870 determines a method of determining the mode of the system 70 using the setting information stored in the third storage unit 950. When the power generation tendency obtained from the power state acquiring unit 480 indicates little change and the amount of charge is 80%, the determining unit 870 selects the second deciding unit 490 as the module used to determine the mode. That is, in this case, the determining unit 870 determines a method of operating the second deciding unit 490 to determine the mode of the system 70.

When the determining unit 870 makes a determination to use a method of determining the mode of the system 70 without using setting information acquiring unit 655 (NO in Step S2008), that is, when the determining unit 870 makes a determination to use the method of operating the second deciding unit 490 to determine the mode of the system 70, the determining unit 870 notifies the second deciding unit 490 of the type of interrupt which occurs and the power state (Step S2012). The second deciding unit 490 determines the mode of the system 70 on the basis of the power state transmitted from the determining unit 870 and the data stored in the fifth storage unit 990 (Step S2013). This determining method is the same as that in the second embodiment. Then, the determining unit 870 notifies the mode setting unit 850 of the setting information about the determined mode and the type of interrupt which occurs (Step S2014). The mode setting unit 850 sets the mode of the system 70 on the basis of the setting information notified by the determining unit 870 (Step S2015). In this way, the system 70 resumes from the sleep state and goes into the mode set by the mode setting unit 850.

When a determination is made to use the setting information acquiring unit 655 to determine the mode of the system 70 (YES in Step S2008), that is, when a determination is made to use the setting information stored in the third storage unit 950 to determine the mode of the system 70, the determining unit 870 notifies the setting information acquiring unit 655 of the interrupt type (Step S2009). The setting information acquiring unit 655 reads the setting information stored in the third storage unit 950 (Step S2010) and notifies the mode setting unit 850 of the read setting information and the type of interrupt which occurs (Step S2011). The mode setting unit 850 sets the mode of the system 70 on the basis of the setting information notified by the determining unit 870 (Step S2015). In this way, the system 70 resumes from the sleep state and goes into the mode set by the mode setting unit 850.

As described above, in the method of letting the processor 100 go into the sleep mode so as to reduce power consumption, it is possible to reduce the power consumption of the processor 100, but overhead increases due to, for example, a process for temporarily stopping the system 70. In addition, power consumption caused by the process (for example, a process of saving data in the register and returning the data, a process of flashing the cache memory, or the like) or the influence of the process (for example, an increase in the number of memory accesses due to the flash operation of the cache memory) is not negligible. In the first state in which the amount of power generated or the amount of charge is sufficient, it is effective to neglect the power consumption in order to reduce the processing time. However, in the second state in which the amount of power generated or the amount of charge is not sufficient, it is considered that it is appropriate to operate the system 70 with a minimum set in terms of the operation of the system 70. In addition, when the amount of power generated or the amount of charge is in a third state between the first state and the second state, it is considered that it is appropriate to operate the system 70 in the mode corresponding to the system interrupt processing time (the mode set by the setting information stored in the third storage unit 950). That is, in the fourth embodiment, the mode of the system 70 is set considering the power state of the power source. Therefore, it is possible to effectively reduce power consumption while maintaining the processing time suitable for the power conditions of the system 70.

Fifth Embodiment

A fifth embodiment differs from the fourth embodiment in that it is determined whether to calculate the system interrupt processing time on the basis of the power state of the power source before the system goes into the sleep state. Hereinafter, the detailed content of this embodiment will be described. In the fifth embodiment, the same components as those in the fourth embodiment are denoted by the same reference numerals and the description thereof will not be repeated. The system according to the fifth embodiment has the same basic structure as that according to the fourth embodiment. In the following description, the system according to the fifth embodiment is represented by the reference numeral 90.

Figure 23:
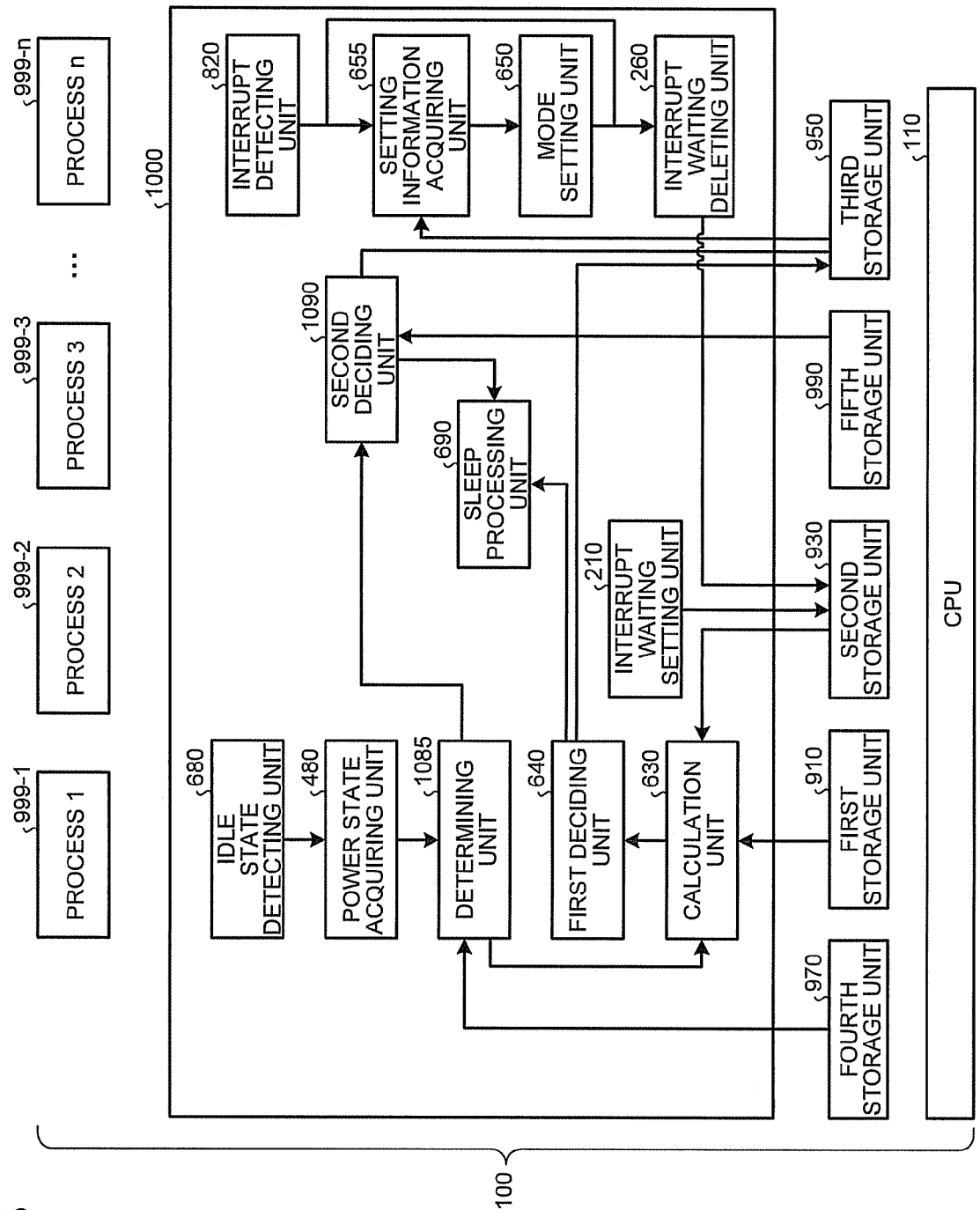
FIG. 23 is a block diagram illustrating an example of the functional structure of a processor according to a fifth embodiment.

FIG. 23 is a block diagram illustrating the structure of the functions implemented by the execution of an OS (operating system) 1000, which is basic software, by a CPU 110 provided in a processor 100 and hardware components of the processor 100. As illustrated in FIG. 20, the hardware components of the processor 100 include the CPU 110, a first storage unit 910, a second storage unit 930, a third storage unit 950, a fourth storage unit 970, and a fifth storage unit 990. In FIG. 23, the processor 100 includes the hardware components of the processor 100, the OS 1000 which operates on the processor 100, and one or a plurality of processes which operate on the OS 1000.

As illustrated in FIG. 23, the OS 1000 includes an interrupt waiting setting unit 210, an idle state detecting unit 680, a power state acquiring unit 480, a second deciding unit 1090, a determining unit 1085, a calculation unit 630, a first deciding unit 640, a sleep processing unit 690, an interrupt detecting unit 820, a setting information acquiring unit 655, a mode setting unit 650, and an interrupt waiting deleting unit 260.

The determining unit 1085 determines a method of determining the mode of the system 90 on the basis of the power state notified by the power state acquiring unit 480. The second deciding unit 1090 determines the mode of the system 90 on the basis of the power state of the power source and registers the determined mode to the third storage unit 950.

Figure 24:
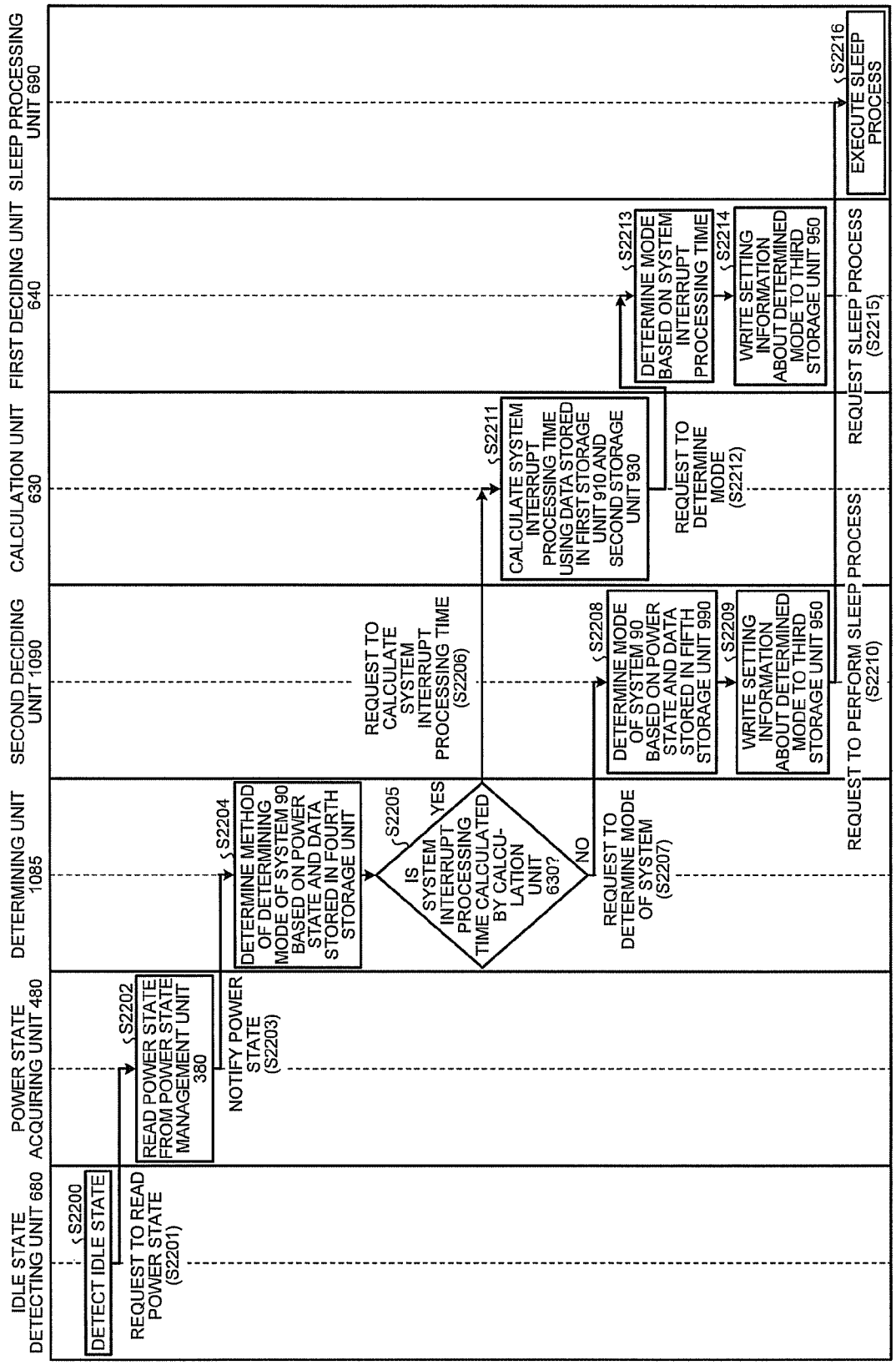
FIG. 24 is a sequence diagram illustrating an example of the sequence of the operation of the processor according to the fifth embodiment.

FIG. 24 is a sequence diagram illustrating an example of the sequence of the operation of the processor 100 until the system goes into the sleep state after an idle state is detected. As illustrated in FIG. 24, first, the idle state detecting unit 680 detects the idle state of the processor 100 (Step S2200) and requests the power state acquiring unit 480 to read the power state (Step S2201). When receiving the request, the power state acquiring unit 480 acquires the power state from the power state management unit 360 (Step S2202). Then, the power state acquiring unit 480 notifies the determining unit 1085 of the acquired power state (Step S2203). Then, the determining unit 1085 determines the method of determining the mode of the system 90 on the basis of the power state acquired from the power state acquiring unit 480 (Step S2204). In the example illustrated in FIG. 24, the determining unit 1085 determines whether to use the calculation of the system interrupt processing time by the calculation unit 630 or to use the second deciding unit 1090 in order to determine the mode of the system 90, on the basis of the power state of the power source acquired from the power state acquiring unit 480 and the data stored in the fourth storage unit 970.

For example, in FIG. 11, a method of determining the mode of the system 90 on the basis of the power generation tendency and the amount of charge is determined. For example, when the power generation tendency indicates an increase in the amount of power generated and the amount of charge is 30%, the mode of the system 90 is determined by the calculation of the system interrupt time by the calculation unit 630. For example, when the power generation tendency indicates an increase in the amount of power generated and the amount of charge is 50%, the second deciding unit 1090 is used to determine the mode of the system 90. For example, when the power generation tendency indicates little change and the amount of charge is 55%, the mode of the system 90 is determined by the calculation of the system interrupt time by the calculation unit 630. For example, when the power generation tendency indicates little change and the amount of charge is 20%, the second deciding unit 1090 is used to determine the mode of the system 90. For example, when the power generation tendency indicates a decrease in the amount of power generated and the amount of charge is 80%, the mode of the system 90 is determined by the calculation of the system interrupt time by the calculation unit 630. For example, when the power generation tendency indicates a decrease in the amount of power generated and the amount of charge is 60%, the second deciding unit 1090 is used to determine the mode of the system 90. However, the embodiment is not limited thereto. For example, the mode determining method may be determined on the basis of only the amount of charge or only a variation in the amount of power generated.

When it is determined that the calculation of the system interrupt processing time by the calculation unit 630 is not executed (NO in Step S2205), that is, when it is determined that the second deciding unit 1090 is used to determine the mode of the system 90, the determining unit 1085 notifies the second deciding unit 1090 of the power state and requests the second deciding unit 1090 to determine the mode of the system 90 (Step S2207). The second deciding unit 1090 determines the mode of the system 90 after resuming from the sleep state on the basis of the power state notified by the determining unit 1085 and the data stored in the fifth storage unit (Step S2208). For example, when the power generation tendency indicates an increase in the amount of power generated and the amount of charge is 50%, the second deciding unit 1090 may determine, as the mode of the system 90, the second mode in which all elements of the system 90 are operated. For example, when the power generation tendency indicates little change and the amount of charge is 70%, the second deciding unit 1090 may determine, as the mode of the system 90, the second mode. For example, when the power generation tendency indicates little change and the amount of charge is 40%, the second deciding unit 1090 may determine, as the mode of the system 90, the first mode in which the minimum number of elements with the minimum power consumption is operated. For example, when the power generation tendency indicates a decrease in the amount of power generated and the amount of charge is 60%, the second deciding unit 1090 may determine the first mode as the mode of the system 90.

Then, the second deciding unit 1090 writes the setting information about the determined mode to the third storage unit 950 (Step S2209). Then, the second deciding unit 1090 requests the sleep processing unit 690 to execute a sleep processing for letting the system 90 go into the sleep state (Step S2210).

On the other hand, when it is determined that the calculation of the system interrupt processing time by the calculation unit 630 is executed (YES in Step S2205), the determining unit 1085 requests the calculation unit 630 to calculate the system interrupt processing time (Step S2206). The processes after Step S2211 are the same as the processes after Step S1602 in FIG. 17 and thus the detailed description thereof will not be repeated.

As described above, in the fifth embodiment, before the system 90 goes into the sleep state (before the system is stopped), the mode of the system 90 (the mode of the system 90 after resuming from the sleep state) is determined on the basis of the power state of the power source. Therefore, it is possible to execute the process according to the power state of the system 90 while effectively reducing the power consumption of the system 90. In the method of determining the optimal mode of the system 90, it is possible to reduce the power consumption of the system 90, but the processing time or power consumption increases according to a process (for example, a process of calculating the system interrupt processing time using the calculation unit 630) for determining the mode of the system 90. In the fifth embodiment, the process for determining the mode of the system 90 is executed only when the mode of the system 90 needs to be dynamically determined on the basis of the power state of the system 90 (only when the power state satisfies the above-mentioned predetermined conditions). In this way, it is possible to effectively reduce power consumption.

Sixth Embodiment

In the first embodiment, the value of the interrupt processing time stored in the first storage unit 910 is a fixed value. However, in a sixth embodiment, the value of the interrupt processing time stored in the first storage unit 910 is set to a variable. Hereinafter, the detailed content of the sixth embodiment will be described. In the sixth embodiment, the same components as those in the first embodiment are denoted by the same reference numerals and the description thereof will not be repeated. The system according to the sixth embodiment has the same basic structure as that according to the first embodiment. In the following description, the system according to the sixth embodiment is represented by the reference numeral 95.

Figure 25:
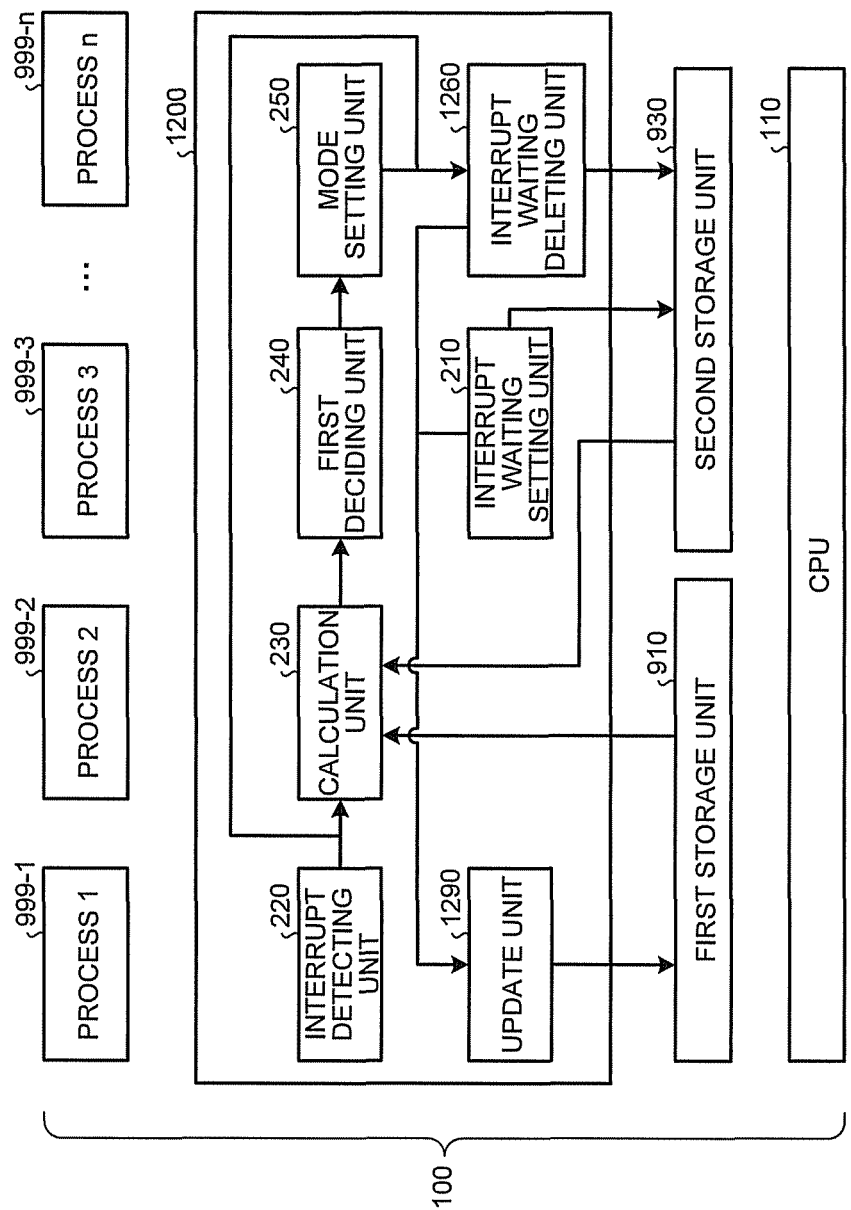
FIG. 25 is a block diagram illustrating an example of the functional structure of a processor according to a sixth embodiment.

FIG. 25 is a block diagram illustrating the structure of the functions implemented by the execution of an OS (operating system) 1200, which is basic software, by a CPU 110 provided in a processor 100 and hardware components of the processor 100. It may be considered that a single OS 1200 operates on the processor 100 and one or a plurality of processes (999-1 to 999-*n*) operate on the OS 1200. In addition, in FIG. 25, the processor 100 includes the hardware components of the processor 100, the OS 1200 which operates on the processor 100, and one or a plurality of processes which operate on the OS 1200.

As illustrated in FIG. 25, the hardware components of the processor 100 includes the CPU 110, a first storage unit 910, and a second storage unit 930. The OS 1200 includes an interrupt waiting setting unit 210, an interrupt detecting unit 220, a calculation unit 230, a first deciding unit 240, a mode setting unit 250, an interrupt waiting deleting unit 1260, and an update unit 1290.

The sixth embodiment differs from the first embodiment in that the interrupt waiting deleting unit 1260 has a function of notifying the update unit 1290 of an interrupt type corresponding to an interrupt process when the interrupt processing starts.

The update unit 1290 starts to measure the interrupt processing time corresponding to the interrupt type in which the interrupt processing starts at the time when the interrupt processing starts, stops the measurement of the interrupt processing time at the time when the interrupt process is completed, and replaces (updates) the value of the interrupt processing time corresponding to the interrupt type among the interrupt processing times stored in the first storage unit 910 with the measurement result.

Figure 26:
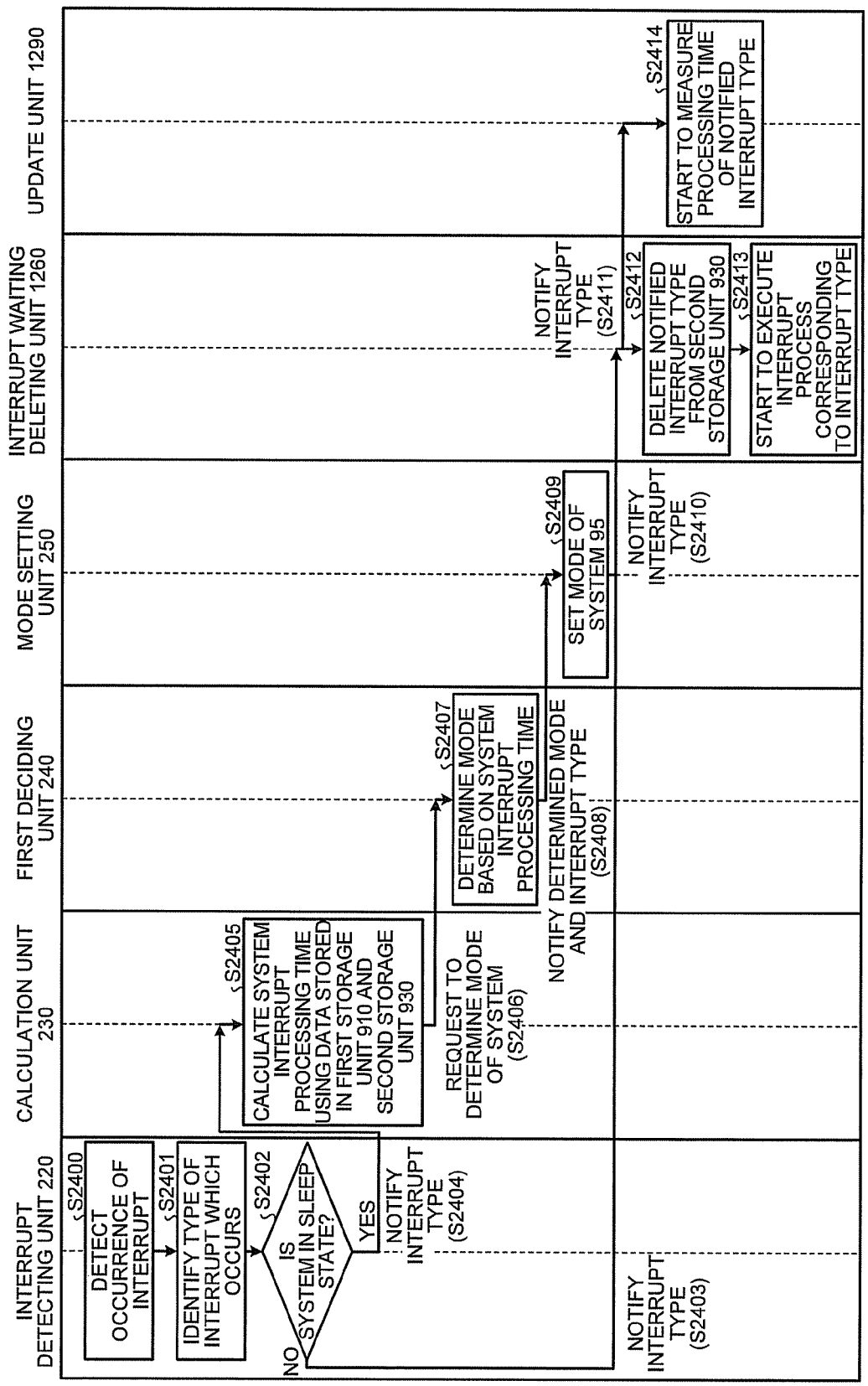
FIG. 26 is a sequence diagram illustrating an example of the sequence of the operation of the processor according to the sixth embodiment.

FIG. 26 is a sequence diagram illustrating an example of the sequence of the operation of the processor 100 until the interrupt processing starts after an interrupt occurs. The contents of Steps S2400 to S2410 are the same as those of Steps S700 to S710 in FIG. 7 and thus the detailed description thereof will not be repeated. In Step S2410, when receiving, from the mode setting unit 250, a event indicating the type of interrupt which occurs, the interrupt waiting deleting unit 1260 notifies the update unit 1290 of the type of interrupt which occurs (Step S2411). When receiving a event indicating the type of interrupt which occurs, the update unit 1290 starts to measure the interrupt processing time corresponding to the notified interrupt type (Step S2414). For example, the update unit 1290 may manage the interrupt type and the current time so as to be associated with each other. The contents of Steps S2412 and S2413 in FIG. 26 are the same as those of Steps S711 and S712 in FIG. 7 and thus the detailed description thereof will not be repeated.

FIG. 27 is a sequence diagram illustrating an example of the sequence of the operation of the processor 100 when interrupt waiting occurs. The contents of Steps S2500 and S2501 are the same as those of Steps S600 and S601 in FIG. 6 and thus the detailed description thereof will not be repeated. After Step S2501, the interrupt waiting setting unit 210 notifies each of the second storage unit 930 and the update unit 1290 of the type of interrupt which is waiting and the interrupt waiting occurrence time (Step S2502). The content of Step S2503 is the same as that of Step S603 in FIG. 6 and thus the detailed description thereof will not be repeated.

When receiving a event indicating the type of interrupt which is waiting and the interrupt waiting occurrence time, the update unit 1290 stops the measurement of the interrupt processing time corresponding to the notified interrupt type and acquires the measurement result as the interrupt processing time corresponding to the interrupt type (Step S2504). Then, the update unit 1290 updates the first storage unit 910 (Step S2505). Specifically, the update unit 1290 replaces the value of the interrupt processing time corresponding to the notified interrupt type among the interrupt processing times stored in the first storage unit 910 with the value of the interrupt processing time acquired in Step S2504.

As described above, in the sixth embodiment, the time period from the start of the interrupt processing to the end thereof is measured and the value of the interrupt processing time stored in the first storage unit 910 is set to a variable. Therefore, it is possible to adjust the value of the processing time stored in the first storage unit 910 to be close to the optimal value in the current system.

Modifications

In the first embodiment, the resume factor indicating a factor for resuming the system from the sleep state is the occurrence of an interrupt. The time required until the interrupt process which is independently executed without overlapping other interrupt processing ends or a plurality of kinds of interrupt processing which are executed so as to at least partially overlap each other end after the system resumes from the sleep state is calculated as the system interrupt processing time, and the mode of the system is set according to the calculated system interrupt processing time. However, the embodiment is not limited thereto. That is, the resume factor is not limited to the occurrence of the interrupt, but may be arbitrarily set. When the resume factor occurs, the mode of the system may be set according to the system processing time (the system interrupt processing time is an example of the system processing time) indicating the time required for a process after the system resumes from the sleep state.

In the example illustrated in FIG. 15, examples of the setting information stored in the third storage unit 950 include the voltage and frequency of the processor 100, information as to whether power is supplied to the primary cache 140, and information as to whether power is supplied to the secondary cache 150, but the embodiment is not limited thereto. The content of the setting information may be arbitrarily set. For example, only the clock (frequency) may be used as the setting information. In addition, information indicating a memory transmission method or a memory transmission rate may be used as the setting information. When some of command sets used in the interrupt processing are limited, information indicating that the supply of power to a portion related to the other command sets is stopped (power is turned off) may be used as the setting information. For example, in the case of an ARM processor, a command set which is called NEON is prepared separately from an ARM standard command. When the command set is separately provided as a system, it is possible to stop the supply of power to a portion corresponding to NEON. FIG. 28 is a diagram illustrating an example of a case in which information indicating the memory transmission method, the memory transmission rate, and an available command set is used as the setting information.

In the above-described embodiments, the processor 100 includes the register 130, the primary cache 140, and the secondary cache 150, but the embodiments are not limited thereto. For example, the processor 100 may not include the primary cache 140 or the secondary cache 150. According to this structure, the primary cache 140 or the secondary cache 150 is not included as an object for setting the mode of the system (an object for forming the system) and the processing related thereto may not be executed. In addition, the processor may include an internal memory which is called a command memory or a data memory, instead of the primary cache 140 or the secondary cache 150, or it may include both the internal memory and the primary cache 140 or the secondary cache 150. According to this structure, in some cases, the internal memory is included as the object for setting the mode of the system and the processing related thereto is executed.

Figure 29:
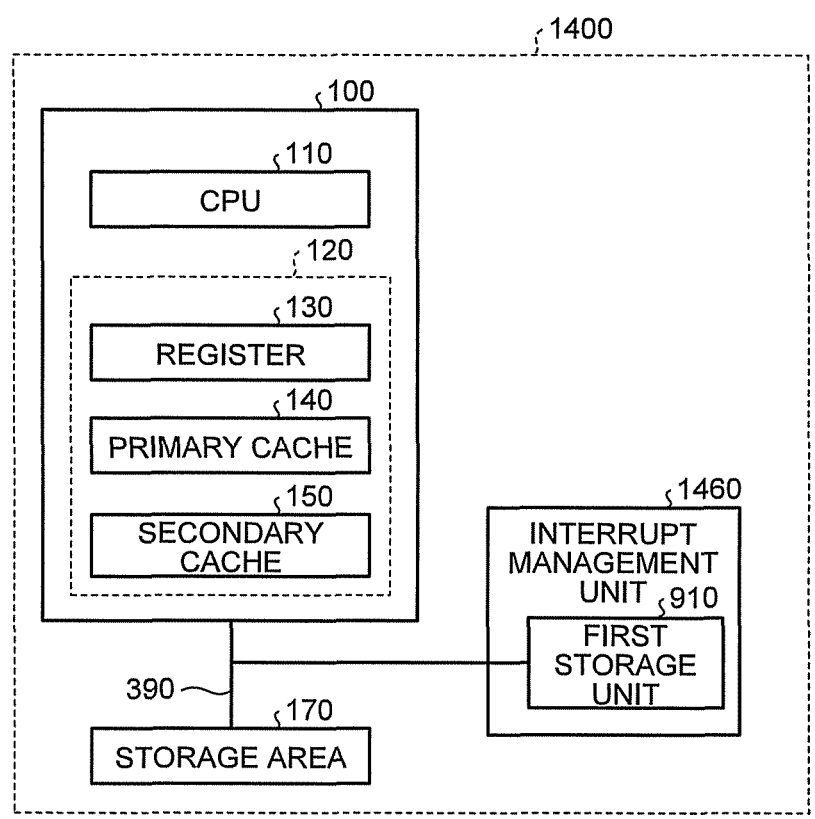
FIG. 29 is a block diagram illustrating an example of the structure of a system according to a modification.

At least some of the functions of the OS (200, 400, 600, 800, 1000, or 1200) may be implemented by hardware other than the processor 100. For example, as illustrated in FIG. 29, the functions of the processor 100 according to the first embodiment may be implemented by an interrupt management unit 1460 which is a hardware component provided separately from the processor 100. In this case, the interrupt management unit 1460 manages the first storage unit 910 and the OS 200 reads data from the first storage unit 910 through the interrupt management unit 1460. In the example illustrated in FIG. 29, the system is represented by the reference numeral 1400.

Figure 30:
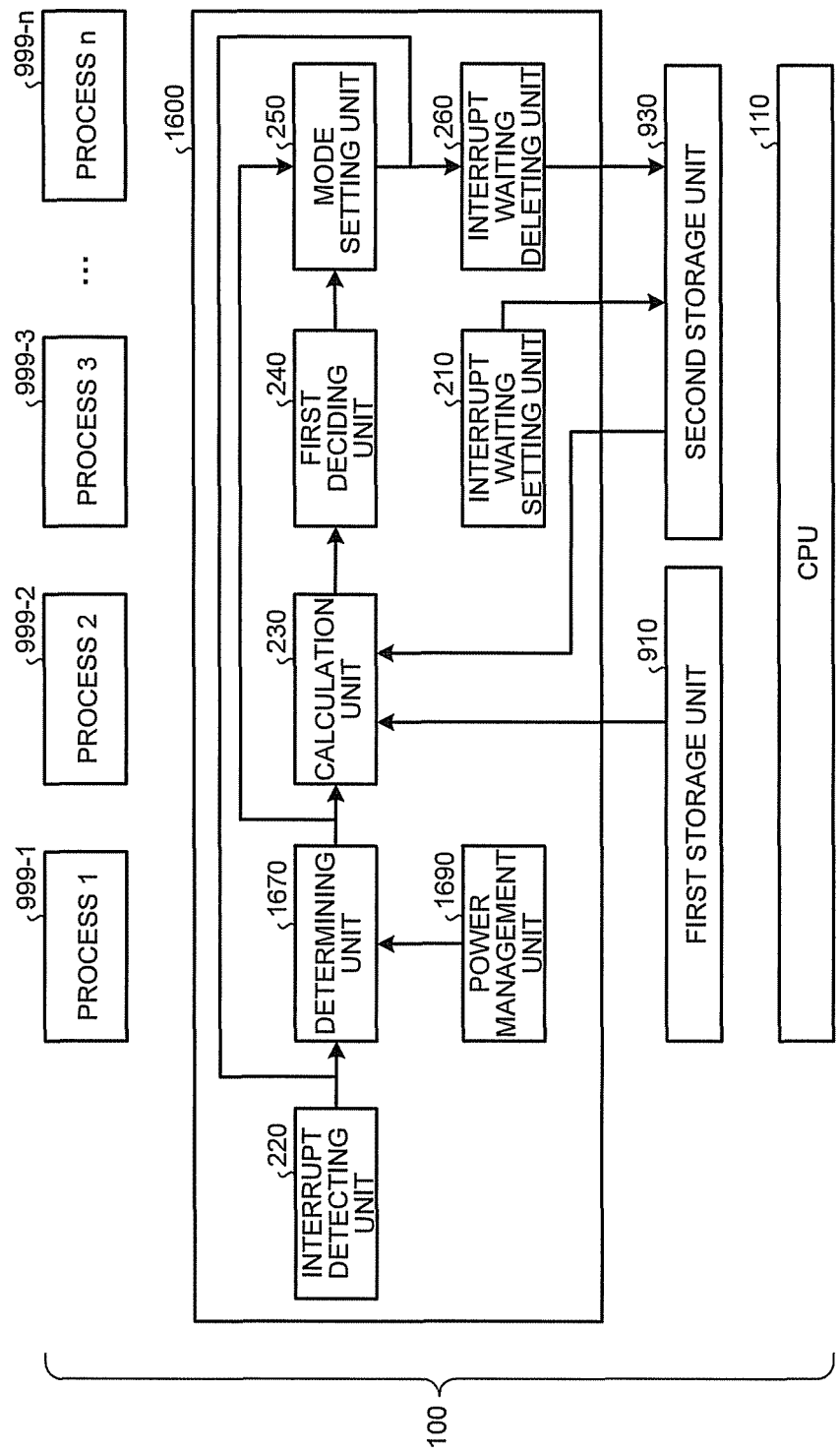
FIG. 30 is a block diagram illustrating an example of the functional structure of a processor according to a modification.

For example, as illustrated in FIG. 30, the power state management unit 360 which is a hardware component in the second embodiment may be formed as a power management unit 1690 which is one of the functions of an OS 1600. The power management unit 1690 periodically acquires the amount of power generated from the power generating module 380 and periodically acquires the amount of charge from the battery 385, thereby estimating the power generation tendency or the charging tendency. A determining unit 1670 may acquire the power state of a target system from the power management unit 1690 to implement the same functions as described above.

The measurement of the interrupt processing time by the update unit 1290 may be executed by each process (999-1 to 999-n). In addition, in the above-described embodiments, the time period from the interrupt occurrence time to the interrupt waiting occurrence time is measured as the interrupt processing time. However, other methods may be considered. For example, the following method may be used: when a plurality of interrupt processes is executed, the time when each interrupt process is executed is accurately measured and the time when the interrupt process is executed is used as the interrupt processing time.

Figure 31:
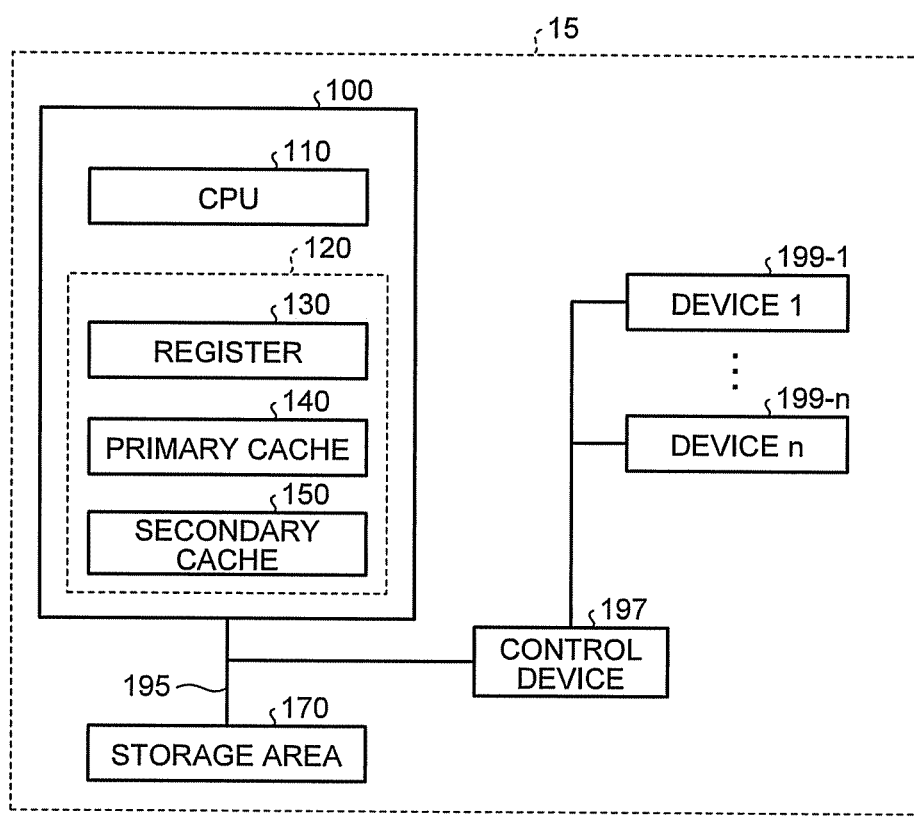
FIG. 31 is a block diagram illustrating an example of the structure of a system according to a modification.

FIG. 31 is a block diagram illustrating an example of the structure of a system 15 according to a modification of the first embodiment. As illustrated in FIG. 31, the system 15 includes a processor 100, a storage area 170, and a control device 197 which are connected to each other by a bus 195. The processor 100 is a processing device which can execute one or a plurality of kinds of processing. The control device 197 receives an interrupt request, which a request for an interrupt from the device, from each of the plurality of devices (a device 1 (199-1) to a device n (199-n)) and determines whether to transmit the received interrupt request to the processor 100. The control device 197 determines whether to store the received interrupt request or to transmit it to the processor 100, on the basis of conditions. As in the system 15, even when the time when an interrupt occurs is changed by the control device 197, the state (mode) of the system 15 is set according to the change in the time. Therefore, it is possible to effectively reduce power consumption.

The program executed by the CPU 110 may be stored on a computer which is connected to a network, such as the Internet, downloaded through the network, and then provided. In addition, the program executed by the CPU 110 may be provided or distributed through the network, such as the Internet. Furthermore, the program executed by the CPU 110 may be incorporated into, for example, ROM and then provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device comprising:
a calculator configured to calculate a system processing time indicating a time required for processing executed after a system, the system including a plurality of elements, power to each element being individually controlled, resumes from a sleep state in which the number of elements supplied with power is limited to a predetermined number and an operation of the system is stopped; and
a setting unit configured to set a mode indicating an operation state of the system according to the system processing time calculated by the calculator when a resume factor indicating a factor for resuming the system from the sleep state occurs.

2. The device according to claim 1,
wherein the setting unit sets the mode such that, as the system processing time increases, the number of elements which are operated increases.

3. The device according to claim 1, further comprising:
a first storage unit; and
a second storage unit,
wherein the resume factor is the occurrence of an interrupt,
the first storage unit stores therein an interrupt type, an interrupt latency, and an interrupt processing time so as to be associated with each other, the interrupt type indicating a type of interrupt which occurs, the interrupt latency indicating a waiting time that elapses from when an interrupt waiting occurs to when an interrupt processing starts, and the interrupt processing time indicating a time required for the interrupt processing;
the second storage unit stores therein the interrupt type and an interrupt waiting occurrence time so as to be associated with each other, the interrupting waiting occurrence time indicating a time at which the interrupt waiting occurs; and the calculator calculates the system processing time using data stored in the first storage unit and the second storage unit.

4. The device according to claim 3, further comprising an interrupt detector configured to detect the occurrence of the interrupt, wherein, when the system is in the sleep state and the interrupt detecting unit detects the occurrence of the interrupt, the calculator reads, from the first storage unit, the interrupt processing time corresponding to the type of interrupt whose occurrence is detected, sets a time after the lapse of the read interrupt processing time from the time when the interrupt detecting unit detects the occurrence of the interrupt as an end time when the interrupt processing for the type of interrupt whose occurrence is detected ends, and calculates the system processing time using the set end time and a time when the interrupt processing for other types of interrupts whose occurrence is not detected starts.

5. The device according to claim 4, wherein the calculator reads the interrupt latency corresponding to each interrupt type from the first storage unit, reads the interrupt waiting occurrence time corresponding to each interrupt type from the second storage unit, calculates an interrupt occurrence time indicating a time when the interrupt processing for each interrupt type starts from the read interrupt latency and the read interrupt waiting occurrence time, and calculates a time period from the time when the interrupt detecting unit detects the occurrence of the interrupt to the end time as the system processing time when the end time is earlier than the interrupt occurrence time of other types of interrupts whose occurrence is not detected.

6. The device according to claim 5, wherein, when there is an interrupt occurrence time earlier than the end time among the interrupt occurrence times of other types of interrupts whose occurrence is not detected, the calculator resets, as the end time, a time after the lapse of the interrupt processing time of the interrupt type corresponding to the interrupt occurrence time from the interrupt occurrence time earlier than the end time.

7. The device according to claim 3, further comprising an update unit configured to measure a time period from the start of the interrupt processing corresponding to each interrupt type to the end of the interrupt processing and updates the interrupt processing time corresponding to the interrupt type among the interrupt processing times stored in the first storage unit to the measured time.

8. The device according to claim 3, further comprising:

a first information storage unit configured to store therein a power state of a power source and a method of determining the mode so as to be associated with each other;

a power state acquiring unit configured to acquire the power state of the power source; and a determining unit configured to determine the method of determining the mode on the basis of the power state of the power source acquired by the power state acquiring unit and data stored in the first information storage unit, wherein the setting unit sets the mode determined by the determining method which is determined by the determining unit.

9. The device according to claim 8, further comprising:

a second information storage unit configured to store therein the power state of the power source and the mode so as to be associated with each other; and a second deciding unit configured to determine the mode on the basis of the power state of the power source acquired by the power state acquiring unit and data stored in the second information storage unit, wherein, when the determining unit makes a determination to use the calculator to determine the mode, the setting unit sets the mode according to the system processing time calculated by the calculator, but when the determining unit makes a determination to use the second deciding unit to determine the mode, the setting unit sets the mode determined by the second deciding unit.

10. The device according to claim 9, wherein the second information storage unit stores therein an amount of charge of the power source and the mode so as to be associated with each other, the power generation tendency indicating a tendency to an increase or decrease in an amount of power generated by the power source, and the second deciding unit reads, from the second information storage unit, the mode which corresponds to the power generation tendency and the amount of charge of the power source acquired by the power state acquiring unit to determine the mode.

11. The device according to claim 9, wherein the second information storage unit stores therein the amount of charge of the power source and the mode so as to be associated with each other, and the second deciding unit reads, from the second information storage unit, the mode which corresponds to the amount of charge of the power source acquired by the power state acquiring unit to determine the mode.

12. The device according to claim 9, wherein the second information storage unit stores therein an increase or decrease in the amount of power generated by the power source and the mode so as to be associated with each other, and the second deciding unit reads, from the second information storage unit, the mode which corresponds to the increase or decrease in the amount of power generated by the power source acquired by the power state acquiring unit to determine the mode.

13. The device according to claim 8, wherein the first information storage unit stores therein a power generation tendency, an amount of charge of the power source, and the method of determining the mode so as to be associated with each other, the power generation tendency indicating a tendency to an increase or decrease in an amount of power generated by the power source, and the determining unit reads, from the first information storage unit, the method of determining the mode which corresponds to the power generation tendency and the amount of charge of the power source acquired by the power state acquiring unit to determine the method of determining the mode.

14. The device according to claim 8, wherein the first information storage unit stores therein the amount of charge of the power source and the method of determining the mode so as to be associated with each other, and the determining unit reads, from the first information storage unit, the method of determining the mode which corresponds to the amount of charge of the power source acquired by the power state acquiring unit to determine the method of determining the mode.

15. The device according to claim 8,
wherein the first information storage unit stores therein an increase or decrease in the amount of power generated by the power source and the method of determining the mode so as to be associated with each other, and
the determining unit reads, from the first information storage unit, the method of determining the mode which corresponds to the increase or decrease in the amount of power generated by the power source acquired by the power state acquiring unit to determine the method of determining the mode.

16. The device according to claim 3, further comprising:
an idle state detecting unit configured to detect an idle state in which the system does not execute any processing;
a sleep processing unit configured to let the system go into the sleep state when the idle state detecting unit detects the idle state;
a first deciding unit configured to determine the mode after the system resumes from the sleep state, on the basis of the system processing time calculated by the calculation unit; and
a first information storage unit configured to store therein setting information which is used to set the mode determined by the first deciding unit,
wherein, when the idle state detecting unit detects the idle state, the calculator calculates the system processing time, the first deciding unit determines the mode after the system resumes from the sleep state on the basis of the system processing time calculated by the calculation unit and stores the setting information about the determined mode in the first information storage unit, and the sleep processing unit lets the system go into the sleep state.

17. The device according to claim 16, further comprising:
a second information storage unit configured to store therein a power state of a power source and a method of determining the mode so as to be associated with each other;
a power state acquiring unit configured to acquire the power state of the power source; and
a determining unit configured to determine the method of determining the mode on the basis of the power state of the power source acquired by the power state acquiring unit and data stored in the second information storage unit,
wherein the setting unit sets the mode determined by the determining method which is determined by the determining unit.

18. The device according to claim 17, further comprising:
a third information storage unit configured to store therein the power state of the power source and the mode so as to be associated with each other; and
a second deciding unit configured to determine the mode on the basis of the power state of the power source acquired by the power state acquiring unit and the data stored in the third information storage unit,
wherein, when the determining unit makes a determination to use the setting information stored in the first information storage unit to determine the mode, the setting unit sets the mode after the system resumes from the sleep state according to the setting information stored in the first information storage unit, and
when the determining unit makes a determination to use the second deciding unit to determine the mode, the setting unit sets the mode after the system resumes from the sleep state to the mode determined by the second deciding unit.

19. The device according to claim 18,
wherein the third information storage unit stores therein an amount of charge of the power source and the mode so as to be associated with each other, the power generation tendency indicating a tendency to an increase or decrease in an amount of power generated by the power source, and
the second deciding unit reads, from the third information storage unit, the mode which corresponds to the power generation tendency and the amount of charge of the power source acquired by the power state acquiring unit to determine the mode.

20. The device according to claim 16, further comprising:
a second information storage unit configured to store therein the power state of the power source and a method of determining the mode so as to be associated with each other;
a power state acquiring unit configured to acquire the power state of the power source; and
a determining unit configured to determine the method of determining the mode on the basis of the power state of the power source acquired by the power state acquiring unit and data stored in the second information storage unit,
wherein, after the setting information used to set the mode determined by the determining method which is determined by the determining unit is written to the third storage unit, the sleep processing unit lets the system go into the sleep state.

21. The device according to claim 20, further comprising:
a third information storage unit configured to store therein the power state of the power source and the mode so as to be associated with each other; and
a second deciding unit configured to determine the mode on the basis of the power state of the power source acquired by the power state acquiring unit and data stored in the third information storage unit,
wherein, when the idle state detecting unit detects the idle state, the determining unit determines the method of determining the mode,
when the determining unit makes a determination to use the calculation unit to determine the mode, the first deciding unit determines the mode after the system resumes from the sleep state on the basis of the system processing time calculated by the calculation unit and stores the setting information about the determined mode in the third storage unit, and
when the determining unit makes a determination to use the second deciding unit to determine the mode, the second deciding unit determines the mode on the basis of the power state of the power source acquired by the power state acquiring unit and the data stored in the fifth storage unit and stores the setting information about the determined mode in the third storage unit.

22. The device according to claim 16,
wherein, when the interrupt occurs in the sleep state, the setting unit sets the mode on the basis of the setting information stored in the first information storage unit.

23. A system comprising:
a plurality of elements, power to each element being individually controlled;
a calculator configured to calculate a system processing time indicating a time required for processing executed after the system resumes from a sleep state in which the number of elements supplied with power is limited to a predetermined number and an operation of the system is stopped; and a setting unit configured to set a mode indicating an operation state of the system according to the system processing time calculated by the calculator when a resume factor indicating a factor for resuming the system from the sleep state occurs.

24. A computer program product comprising a computer-readable medium containing a computer program that causes a computer to execute:

calculating a system processing time indicating a time required for processing executed after a system, the system including a plurality of elements, power to each element being individually controlled, resumes from a sleep state in which the number of elements supplied with power is limited to a predetermined number and an operation of the system is stopped; and setting a mode indicating an operation state of the system according to the system processing time calculated in the calculating when a resume factor indicating a factor for resuming the system from the sleep state occurs.

25. A control device configured to operate, when a resume factor occurs for resuming a system including a plurality of elements, power to each element being individually controlled, from a sleep state in which the number of elements supplied with power is limited to a predetermined number and an operation of the system is stopped, the system operates in a mode according to a system processing time indicating a time required for processing executed after the system resumes from the sleep state.

26. An information processing system including a plurality of elements, power to each element being individually controlled, wherein when a resume factor occurs for resuming the information processing system from a sleep state in which the number of elements supplied with power is limited to a predetermined number and an operation is stopped, the information processing system operates in a mode according to a time required for processing executed after the information processing system resumes from the sleep state.

* * * * *